United States Patent [19]
Mowill

[11] Patent Number: 5,628,182
[45] Date of Patent: May 13, 1997

[54] STAR COMBUSTOR WITH DILUTION PORTS IN CAN PORTIONS

[76] Inventor: R. Jan Mowill, OPRA B.V. Opaalstraat 60, P.O. Box 838, 7550 AV Hengelo, Netherlands

[21] Appl. No.: 450,948

[22] Filed: May 23, 1995

Related U.S. Application Data

[63] Continuation-in-part of Ser. No. 394,037, Feb. 24, 1995, abandoned, which is a continuation-in-part of Ser. No. 376,360, Jan. 23, 1995, abandoned, which is a continuation-in-part of Ser. No. 348,829, Nov. 29, 1994, Pat. No. 5,572,862, which is a continuation-in-part of Ser. No. 264,844, Jul. 5, 1994, which is a continuation-in-part of Ser. No. 261,256, Jun. 14, 1994, Pat. No. 5,481,866, which is a continuation of Ser. No. 86,833, Jul. 7, 1993, abandoned.

[51] Int. Cl.$^6$ ........................................ F02C 3/14
[52] U.S. Cl. .................... 60/39.36; 60/39.37; 60/737
[58] Field of Search ................. 60/39.23, 39.36, 60/39.37, 734, 737, 738, 746

[56] References Cited

U.S. PATENT DOCUMENTS

| | | |
|---|---|---|
| 1,705,383 | 3/1929 | Weiss. |
| 2,108,822 | 2/1938 | Lippincott. |
| 2,183,836 | 12/1939 | Gordon, Jr.. |

(List continued on next page.)

FOREIGN PATENT DOCUMENTS

| | | |
|---|---|---|
| 0074196 | 3/1983 | European Pat. Off.. |
| 0247984 | 12/1987 | European Pat. Off.. |
| 1246455 | 10/1960 | France. |

(List continued on next page.)

OTHER PUBLICATIONS

Sheperd, D.G. "Principles of Turbomachinery", New York, The Macmillan Co., 1956., pp. 282–289.

Csanady, G.T. "Turbomachines", New York; McGraw-Hill Book Co., 1964, pp. 14–23.

Cox, H.R., "Gas Turbine Principles and Practice", D. Van Nostrand, pp. 2–26, 2–39.

Treager, E.E., "Aircraft Gas Turbine Technology", 2nd Ed., p. 10.

Leonard, G. and Stegmaier, J., "Development of an Aero-derivative Gas Turbine DLE Compustion System," Diesel & Gas Turbine Worldwide, May 1993 Fuel Injector Cuts NOx; Professional Engineering, Sep. 1994.

Yamada et al., "On–Engine Evaluation of Emissions Characteristics of a Variable Geometry Lean–Premixed Combustor," ASME 95–GT–48, presented at the International Gas and Aeroengine Congress & Exposition, Houston, Texas Jun. 5–8, 1995.

*Primary Examiner*—Louis J. Casaregola
*Attorney, Agent, or Firm*—Finnegan, Henderson, Farabow, Garrett & Dunner

[57] ABSTRACT

A generally annular combustor system has a chamber with an annular chamber portion and a plurality of can-like chamber portions protruding from the annular chamber portion. An external fuel/air premixer is associated with each can chamber portion to provide a mixture with a desired (generally lean) fuel/air ratio tangentially through the can sidewall. A first portion of the total compressed air flows to the premixers, a second portion enters the combustion chamber through ports which, for can chamber volumes sufficient for complete combustion, can be located in the can chamber portion proximate the connection between the can portion and the annular portion. The premixer associated with each can chamber portion preferably includes a venturi and a fuel nozzle for spraying liquid fuel or gas into the venturi inlet to provide a fully premixed fuel/air mixture. An auxiliary fuel nozzle can be positioned in the annular portion for selectively supplying fuel for reheat of the combustion gases, using the dilution air, to maintain combustor outlet temperature. The annular chamber portion advantageously can be nested between the compressor and turbine components of large axial flow-type gas turbines in retrofit applications.

15 Claims, 16 Drawing Sheets

U.S. PATENT DOCUMENTS

| | | |
|---|---|---|
| 2,268,270 | 12/1941 | Traupel . |
| 2,469,238 | 5/1949 | Newton . |
| 2,487,514 | 11/1949 | Boestadet et al. . |
| 2,488,969 | 11/1949 | Dietler . |
| 2,489,939 | 11/1949 | Traupel . |
| 2,513,601 | 7/1950 | Traupel . |
| 2,608,822 | 9/1952 | Pavlecka et al. . |
| 2,620,626 | 12/1952 | Lysholm .......................... 60/39.36 |
| 2,621,475 | 12/1952 | Loy . |
| 2,625,012 | 1/1953 | Larrecq . |
| 2,663,141 | 12/1953 | Hage . |
| 2,675,673 | 4/1954 | Mallinson et al. . |
| 2,837,894 | 6/1958 | Kind . |
| 2,988,884 | 6/1961 | Pouit . |
| 2,999,359 | 9/1961 | Murray . |
| 3,088,279 | 5/1963 | Diedrich .......................... 60/39.36 |
| 3,091,080 | 5/1963 | Crim et al. . |
| 3,099,134 | 7/1963 | Calder et al. . |
| 3,204,406 | 9/1965 | Howes et al. . |
| 3,315,467 | 4/1967 | De Witt . |
| 3,626,444 | 12/1971 | Caruel et al. . |
| 3,765,170 | 10/1973 | Nakamura . |
| 3,768,962 | 10/1973 | Baranowski, Jr. . |
| 3,869,865 | 3/1975 | Lacroix et al. . |
| 3,899,884 | 8/1975 | Ekstedt . |
| 3,905,192 | 9/1975 | Pierce et al. . |
| 3,958,413 | 5/1976 | Cornelius et al. . |
| 4,012,904 | 3/1977 | Nogle . |
| 4,030,288 | 6/1977 | Davis et al. . |
| 4,073,137 | 2/1978 | Roberts . |
| 4,192,139 | 3/1980 | Buchheim . |
| 4,215,535 | 8/1980 | Lewis . |
| 4,255,927 | 3/1981 | Johnson et al. . |
| 4,260,367 | 4/1981 | Markowski et al. . |
| 4,286,430 | 9/1981 | Smith . |
| 4,297,842 | 11/1981 | Gerhold et al. . |
| 4,301,657 | 11/1981 | Penny . |
| 4,305,255 | 12/1981 | Davies et al. . |
| 4,356,698 | 11/1982 | Chamberlain . |
| 4,389,848 | 6/1983 | Markowski et al. . |
| 4,412,414 | 11/1983 | Novick et al. . |
| 4,457,704 | 7/1984 | Sommers et al. . |
| 4,610,135 | 9/1986 | Alexander . |
| 4,641,495 | 2/1987 | Mowill . |
| 4,700,542 | 10/1987 | Wang . |
| 4,702,070 | 10/1987 | Cureton et al. . |
| 4,747,262 | 5/1988 | Maynard . |
| 4,766,721 | 8/1988 | Iizuka et al. . |
| 4,807,433 | 2/1989 | Maclin et al. . |
| 4,829,764 | 5/1989 | Iizuka et al. . |
| 4,838,029 | 6/1989 | Gleason et al. . |
| 4,845,944 | 7/1989 | Rodgers . |
| 4,845,952 | 7/1989 | Beebe . |
| 4,893,466 | 1/1990 | Egnell et al. . |
| 4,898,001 | 2/1990 | Kuroda et al. . |
| 4,928,481 | 5/1990 | Joshi et al. . |
| 4,944,149 | 7/1990 | Kuwata . |
| 4,966,001 | 10/1990 | Beebe . |
| 4,974,415 | 12/1990 | Shekleton et al. . |
| 5,016,443 | 5/1991 | Shimizu et al. . |
| 5,069,029 | 12/1991 | Kuroda et al. . |
| 5,070,700 | 12/1991 | Mowill . |
| 5,081,832 | 1/1992 | Mowill . |
| 5,156,002 | 10/1992 | Mowill . |
| 5,214,911 | 6/1993 | Shekleton . |
| 5,218,824 | 6/1993 | Cederwall et al. . |
| 5,257,499 | 11/1993 | Leonard . |

FOREIGN PATENT DOCUMENTS

| | | |
|---|---|---|
| 2189630 | 1/1974 | France . |
| 2415203 | 8/1979 | France . |
| 748208 | 10/1944 | Germany . |
| 833739 | 3/1952 | Germany . |
| 872698 | 4/1953 | Germany . |
| 2629761 | 5/1978 | Germany . |
| 2812237 | 5/1978 | Germany . |
| 3332959 | 3/1985 | Germany . |
| 3835415 | 5/1989 | Germany . |
| 9215856 | 2/1993 | Germany . |
| 55-45739 | 11/1980 | Japan . |
| 57-41524 | 8/1982 | Japan . |
| 283198 | 5/1952 | Switzerland . |
| 668834 | 3/1952 | United Kingdom . |
| 301137 | 11/1954 | United Kingdom . |
| 720436 | 12/1954 | United Kingdom . |

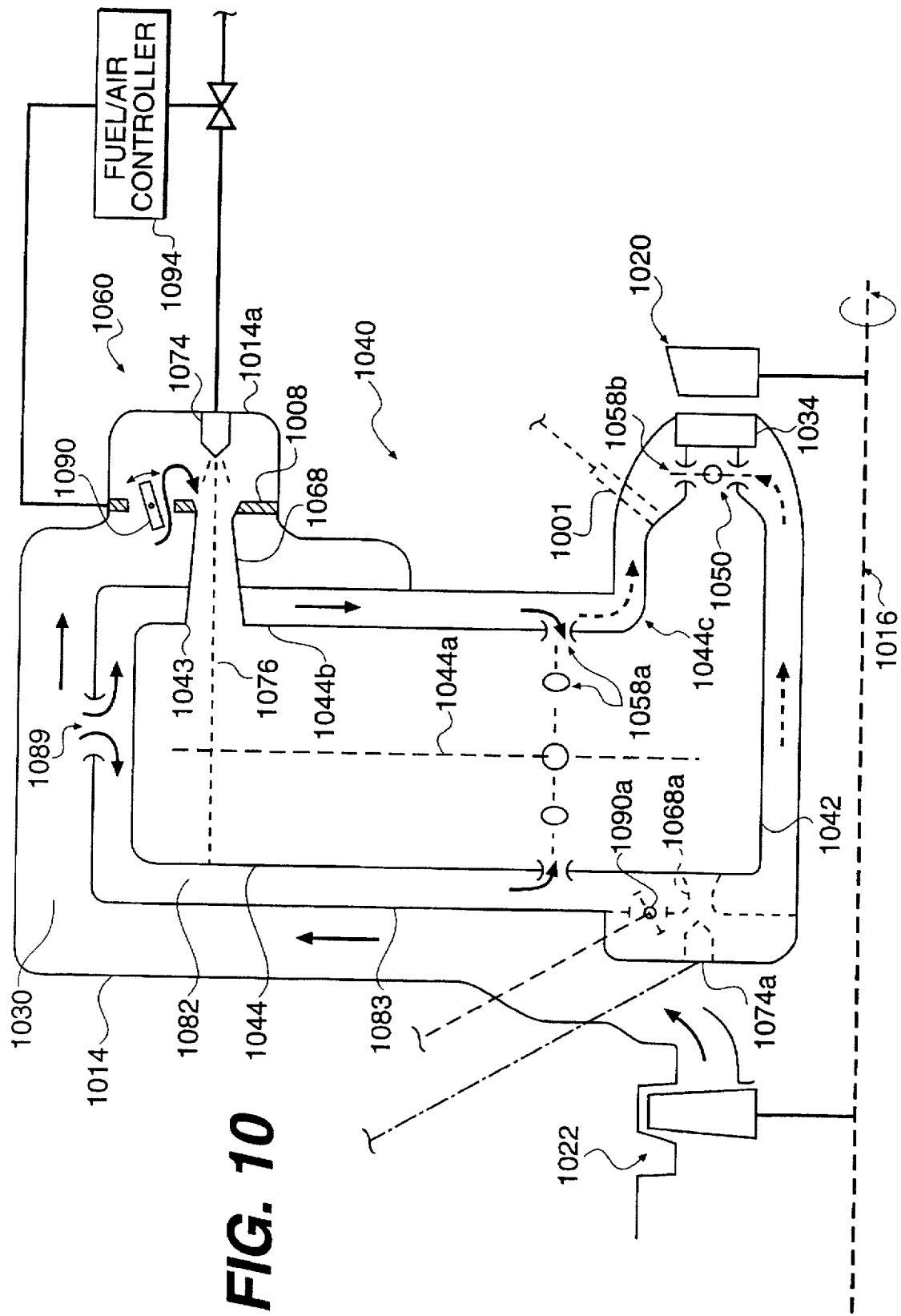

STAR COMBUSTOR WITH DILUTION PORTS IN CAN PORTIONS

This application is a continuation-in-part of application Ser. No. 08/394,037 filed Feb. 24, 1995 (abandoned), which is a continuation-in-part of pending application Ser. No. 08/376,360, filed Jan. 23, 1995 (abandoned), which is a continuation-in-part of pending application Ser. No. 08/348,829, filed Nov. 29, 1994 (U.S. Pat. No. 5,572,862), which is a continuation-in-part of pending application Ser. No. 08/264,844, filed Jul. 5, 1994, which is a continuation-in-part of pending application Ser. No. 08/261,256, filed Jun. 14, 1994 (U.S. Pat. No. 5,481,866), which is a continuation of Ser. No. 08/086,833, filed Jul. 7, 1993 (abandoned).

BACKGROUND OF THE INVENTION

1. Field of the Invention

This invention relates to a combustion system for gas turbine gas generators, gas turbine engines, jet engines or other heat devices, which can produce low levels of oxides of nitrogen and carbon monoxide. Specifically, the present invention relates to a system, process, and apparatus for combusting fuel in a gas turbine engine or gas generator module which significantly lowers $NO_x$ and CO levels by providing a nearly constant fuel/air ratio for lean combustion in the combustion zone at all engine operating conditions in addition to thoroughly premixing the fuel and air prior to combustion and, preferably, completely vaporizing a liquid fuel. More specifically, the present invention relates to improvements in certain combustor components, particularly the combustion chamber and dilution air control, that are highly useful in retrofit applications.

2. Description of the Art

Although gas turbine devices such as engines and gas generators do not produce the majority of the nitrogen oxide emissions released into the earth's atmosphere, reducing those emissions will reduce the total and, in that regard, many countries have enacted laws limiting the amounts that may be released. The reaction of nitrogen and oxygen in the air to form nitrogen oxides, like almost all chemical reactions, proceeds faster at higher temperatures. One way to limit the amount of $NO_x$ formed is to limit the temperature of the reaction. The $NO_x$ produced in gas turbine devices is produced in the combustion process where the highest temperature in the cycle normally exists. Therefore, one way to limit the amount of $NO_x$ produced is to limit the combustion temperature.

Various attempts have been made to limit the combustion temperature and thereby $NO_x$ production in both "single stage" combustors (i.e., those having only a single combustion zone where fuel and air are introduced) and "multistage" combustors, including pilot burners where several, serial connected combustion zones having separate fuel and air introduction means are used. U.S. Pat. Nos. 4,994,149, 4,297,842, and 4,255,927 disclose single stage gas turbine combustors where the flow of compressed air to the combustion zone and the dilution zone of an annular combustor are controlled to decrease the concentration of $NO_x$ in the turbine exhaust gases. In the above combustors, essentially unmixed fuel and air are separately admitted to the combustor, with mixing and combustion consequently occurring within the same chamber. See also Japanese Laid-Open No. 55-45739. U.S. Pat. Nos. 5,069,029, 4,898,001, 4,829,764, and 4,766,721 disclose two stage combustors. See also German Gebrauchsmuster, 99215856.0. Again, however, fuel and air are provided to each stage at least partially unmixed with complete mixing occurring within the respective combustion zones.

Attempts also have been made to utilize separate premixer chambers to provide a premixed fuel-air flow to a combustor. Japan Laid-Open Application No. 57-41524 discloses a combustor system which appears to premix only a portion of the total fuel flow to a multistage can-type combustor in a separate mixing chamber prior to introduction to the staged combustion chambers. In U.S. Pat. No. 5,016,443, a large number of separate fuel nozzles is used to inject fuel into an annular premixer chamber. However, the complexity of the above constructions employing multiple fuel nozzles and fuel splitting devices can lead to control difficulties, as well as a high initial cost.

SUMMARY OF THE INVENTION

Thus, it is an object of the invention to provide a combustor system and apparatus for use with gas turbine gas generator and engine modules, which apparatus results in low emissions of $NO_x$, CO and unburned fuel and fuel by-products over the entire operating range of the gas turbine gas generator or engine module.

It is a further object of the present invention to provide an apparatus that is much less complex than other state of the art annular combustor apparatus and systems thereby facilitating ease of operation, lower initial cost of the apparatus, and substantially improved fuel/air control by the avoidance of matching a large number of staged separate premixers. The present invention also drastically reduces thermal gradients, thus reduces the conditions for liner cracking and hence provides for increased liner life.

It is still a further object of the present invention to provide a premixer apparatus that is especially suited for liquid fuels for use in the combustor system while still providing for dual fuel (gas) capabilities.

And it is yet an additional object of the present invention to provide a combustor system and apparatus that can be used with relatively large gas turbine engines including axial flow gas turbines, particularly in retrofit applications having a predetermined space envelope.

In accordance with the present invention, as embodied and broadly described herein, the combustor for combusting fuel and compressed air to produce combustion gases, for use in a gas turbine having a compressor and a turbine mounted spaced apart on a common shaft, comprises a chamber having an annular chamber portion having an axis, a radially outer surface, and an exit for delivery of combustion gases. The chamber further includes at least one can chamber portion protruding from the radially outer surface and flow connected to the annular chamber portion. The combustor also has inlet means for admitting the fuel and the compressed air for combustion into the can chamber portion, and the annular chamber portion is configured radially to surround the shaft and axially to nest between the compressor and the turbine.

It may be preferred that the can chamber portion is proportioned such that substantially complete combustion occurs in the can chamber portion, and that dilution air inlet means including dilution air inlet ports are provided proximate the flow connection between the can chamber portion and the annular chamber portion.

It may also be preferred that the can chamber portion has an axis and a circumferential side wall; that the fuel/air inlet means includes a first inlet positioned in the circumferential side wall of the can chamber portion distant the annular chamber portion; and that the can chamber portion includes in the circumferential side wall a second inlet proximate the annular chamber portion for admitting compressed air for dilution.

It may be still further preferred that the combustor has means for reheating the combustion gases in the annular chamber portion, including means for introducing additional fuel into the annular chamber portion for combustion with a portion of the admitted dilution air, and also that the reheating means is responsive to the temperature of the combustion gases proximate the annular chamber exit.

The technical considerations for the above-described invention involve the dynamics of the combustion process. The amount of nitrogen oxide in the exhaust can be expressed by the following equation:

$$NO_x = 3.2*10^{-6}*EXP(7.97*10^{-3}*T)\sqrt{P}$$

where T is the flame temperature in degrees Kelvin, $NO_x$ is the nitrogen oxide concentration coming out of the combustion zone, expressed as $NO_2$, in parts per million by volume, and P is the pressure in atmospheres. The flame temperature is a function of both the fuel/air ratio for completely premixed mixtures and of the combustor inlet air and fuel temperatures. Experience has shown that the flame in a combustor will continue to burn if the flame temperature is above about 2550 degrees Rankine (1417 degrees Kelvin) for pure fuels, or slightly higher for fuels containing a noncombustible diluent, such as nitrogen. However, at this level, the flame is close to extinction and the carbon monoxide emissions are high.

To have acceptably low levels of both pollutants, it is desirable to establish a fuel/air ratio that, in conjunction with the combustor inlet temperatures, will produce a flame temperature of about 2800 to 3000 degrees Rankine (1556 to 1667 degrees Kelvin). Use of the equation will show that the $NO_x$ levels will be between 0.8 and 2.0 ppmv (parts per million by volume) at one atmosphere before the dilution air is added to reduce them still more. Experience also has shown that carbon monoxide levels at these temperatures will be below 20 ppmv and will be even lower at higher pressures.

The constant fuel/air ratio in the combustion chamber of the present invention is produced by adjusting the air flow to the premixer to be proportional to the fuel flow. Experience has shown that it is not enough to just limit the average temperature because, when a fuel is burned as drops of liquid or a diffusion gas flame, the combustion proceeds at near the stoichiometric value and the local temperature is very high, thus producing excessive $NO_x$. To produce the lowest possible $NO_x$, the annular combustor of the present invention thoroughly premixes all the fuel and combustion air in a premixing chamber including a venturi separate from the combustion chamber itself, and if a liquid fuel is used, evaporates the fuel before premixing the fuel and air to be used in the combustion. Some gas turbine engine applications exhibit a nearly constant air flow regardless of power level (primarily single shaft direct-coupled electricity producers which must run at constant speed) and some have an air flow that decreases as the power level is reduced (such as free turbine units and propulsion units). To maintain a constant fuel/air ratio in both types of units, it is often necessary to provide an air valve, coupled to the fuel valve, which provides the amount of air needed for a nearly constant fuel/air ratio. Obviously the valves will be different in the two types of engines, but the principle is the same.

However, certain aspects of the present invention are highly useful even in applications where precise control of the fuel/air ratio afforded by a separate compressed air valve may not be needed, as in free-turbine and free-jet propulsion applications. In these applications, gross control of the compressed air is accomplished, to a certain degree, by virtue of the dependency of gas generator RPM on fuel flow. Thus, the increased combustion efficiencies and simplicity of construction resulting from the tangential admission of the premixed fuel/air, and the use of substantially all the compressed air flow portion not premixed with the fuel for convective cooling, are significant advantages available for such applications in which a compressed air valve, if included, could be preset to a constant opening or the valve eliminated entirely.

Having one combustion zone does in no way limit the number of premixers used. Several premixers could be disposed peripherally in lieu of a single such unit in order to accommodate a larger or shallower annular combustor. These premixers would function essentially simultaneous.

In this invention only one combustion zone is used although the combustion chamber can have connected portions of different shapes, and the fuel/air ratio and flame temperature will always be high enough to effectively burn the carbon monoxide and hydrocarbons. This invention not only produces low emissions of nitrogen oxides, but low emissions of carbon monoxide and unburned hydrocarbons as well by avoiding transition zones between stages of combustion as normally practiced. Since this invention has only one combustion zone, it is not necessary to separate a primary and secondary combustion zone (multistage combustor) or to cool such a separation. Also, it may not be necessary to use a pilot flame or associated apparatus. Furthermore, the control system is vastly simplified by having one fuel control valve which must be precise and, at most, one compressed air control valve associated with each premixer which is more forgiving where accuracy and leakage are concerned than are staged fuel valves. Additional simplification is possible in certain applications which allow the elimination of the compressed air control valve.

The air-fuel mixing devices particularly described and shown in detail hereinafter, provides a nearly uniform fuel/air weight ratio at its exit. Of course, it is necessary to keep the axial velocity above the turbulent flame speed at all points within the venturi and to prevent any flash-back caused by recirculation within the fuel/air mixing system. If these requirements are met, combustion cannot be sustained before the fuel/air mixture leaves the premixing device.

Other objects and advantages of the invention will be set forth in part in the description which follows, and in part will be apparent from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitutes part of the specification, illustrate preferred embodiments of the invention and, together with the description serve to explain the principles of the invention.

In the drawings:

FIG. 10 is a variation of the embodiments shown in FIGS. 9A–9E.

DESCRIPTION OF THE PREFERRED EMBODIMENTS

Reference will now be made to the present preferred embodiment of the invention which is illustrated in the accompanying drawings.

Figure 1:
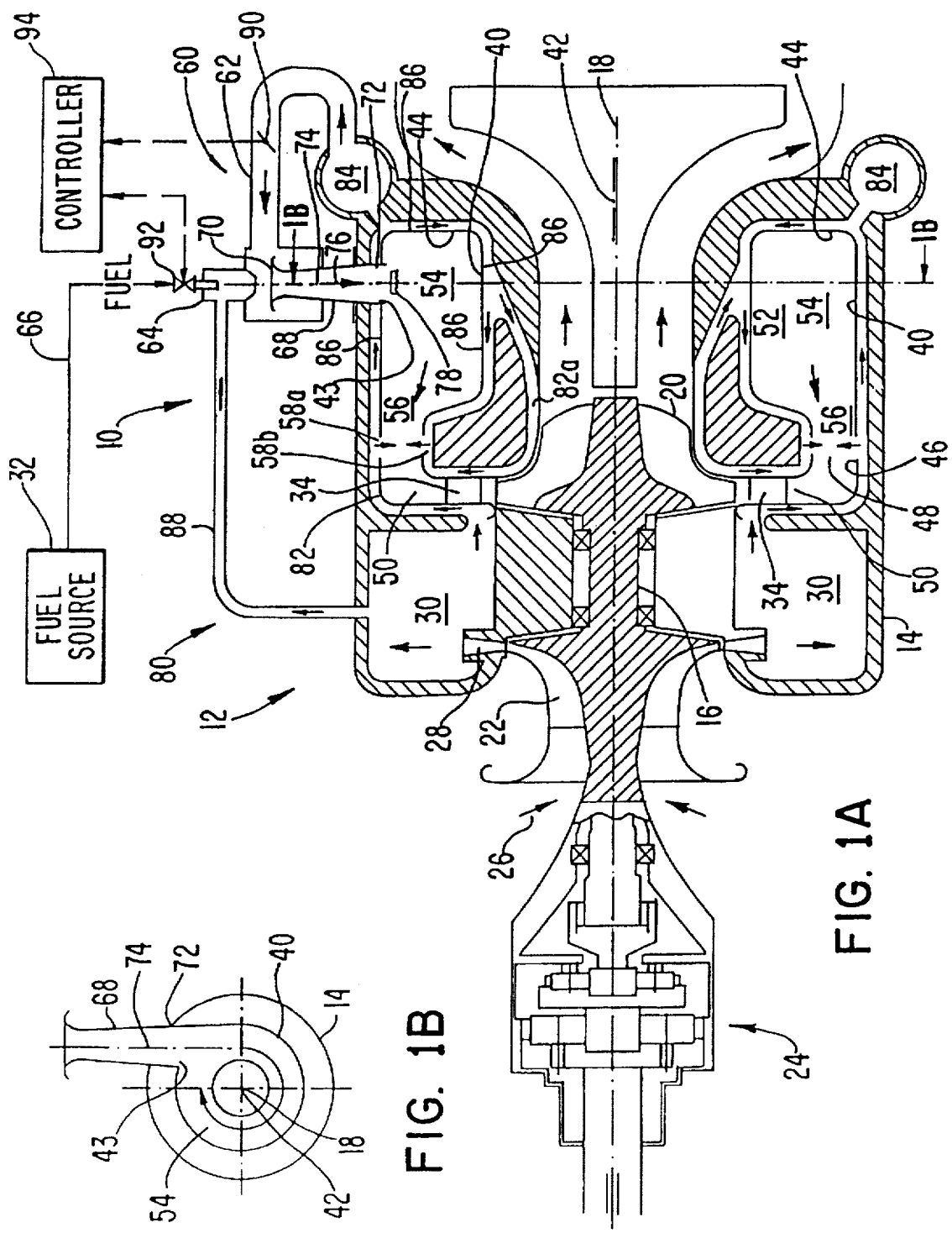
FIG. 1A is a cross sectional schematic of a gas turbine engine module utilizing a combustor system made in accordance with the present invention.
FIG. 1B is a schematic end view of the apparatus shown in FIG. 1A taken in the direction AA in FIG. 1A.

With initial reference to FIG. 1A, there is shown a combustor system made in accordance with the present invention and designated generally by the numeral 10. System 10 is depicted as being used in conjunction with radial gas turbine engine module 12. Gas turbine engine module 12 includes a pressure housing 14 within which is mounted shaft 16 rotatable about axis 18. Mounted on one end of a shaft 16 is radial turbine 20 for driving centrifugal compressor 22 mounted at the opposed end of shaft 16. In the configuration depicted in FIG. 1A, gas turbine engine module 12 power is taken out through a mechanical coupling arrangement shown generally at 24 adjacent centrifugal compressor 22. However, the combustor system of the present invention can be utilized in a gas generator in association e.g., with a "free power turbine" (see FIG. 5A), a "free-jet" propulsion unit (not shown), or any other turbine engine system version with one or more premixer assemblies as one skilled in the art would immediately realize. Also, the present invention is not limited to use in a radial gas turbine engine or gas generator module but, at least in its broadest extent, could be used with axial or mixed axial-radial turbine engine and gas generator modules as well.

With continued reference to FIG. 1A, gas turbine engine module 12 operates generally as follows. Air enters centrifugal compressor 22 in a direction designated by the arrows 26, is centrifugally accelerated to increase its velocity, where-upon it enters diffuser 28 to increase static pressure. The compressed air exiting diffuser 28 is collected in a plenum chamber 30. Thereafter, compressed air from plenum 30 is mixed with fuel from a fuel source 32 by means of premixer 60 of combustor system 10, to be described in more detail hereinafter, and combusted to produce hot exhaust gases which flow past inlet guide vanes 34 to radial turbine 20, where power is extracted. The exhaust gases from turbine 20 are ducted to the atmosphere or to a subsequent engine module. In the case of free power turbine arrangement, the gases exiting turbine 20 would be ducted to the free power turbine for extraction of further power.

In accordance with the present invention, the combustor system includes a cylindrical housing defining a combustion chamber, the housing having an axis and having at least one inlet port adjacent one axial chamber end. Importantly, the portion of the chamber adjacent the one axial chamber end comprises a single stage combustion zone. An exhaust is positioned at the opposite axial chamber end, with the portion of the combustion chamber adjacent the opposite axial chamber end comprising a dilution zone. The housing further has aperture means in the form of dilution ports in flow communication with the dilution zone.

As embodied herein, and with continued reference to FIG. 1A, combustor system 10 includes annular combustor liner housing 40 which is generally toroidal in shape. Although the preferred embodiment is illustrated with an annular housing, a "can-type" cylindrical housing could also be used. Housing 40 is contained within pressure vessel 14 and defines an axis 42 essentially coincident with gas turbine engine module axis 18. Housing 40 is closed at axial end 44 except for inlet port 43, but is open at axial end 46 to form an annular exhaust port 48. Exhaust port 48 is in flow communication with radial turbine 20 through channel 50 past inlet guide vanes 34.

With continued reference to FIG. 1A, toroidal chamber 52 defined by housing 40 comprises two generally axial sections with different functions. Section 54 adjacent axial end 44 comprises a single stage combustion zone and section 56 adjacent housing end 46, comprises a dilution zone. A plurality of apertures 58a, 58b are provided in housing 40 opening into dilution zone 56. Dilution ports 58a are a series of apertures formed in the outer peripheral surface of housing 40, while dilution ports 58b are a series of apertures formed in an inner peripheral surface of housing 40, relative to housing axis 42. The aperture means generally comprising dilution ports 58a, 58b provide for the introduction of compressed air into the dilution zone 56 of combustion chamber 52 from compressed air conduit means which will be described in more detail hereinafter. However, dilution apertures need not be placed in both inner and outer walls of the combustion liner. For example, aperture 58a may be eliminated if apertures 58b are used and sized to accommodate the entire dilution flow rate.

Further in accordance with the present invention, at least one fuel/air premixer disposed outside the cylindrical housing is provided for mixing a portion of the compressed air flow with fuel to provide a fuel/air mixture and delivering the mixture to the combustion zone through the inlet port. The fuel/air premixer includes means for receiving the compressed air, means for receiving the fuel and also chamber means for flow-smoothing the received compressed air and for mixing the received compressed air and fuel. As embodied herein and with continued reference to FIG. 1A, combustion system 10 further includes a single fuel/air premixer designated generally by the numeral 60. Premixer 60 includes housing assembly 62 for receiving the compressed air from conduit means which will be described in more detail hereinafter, and a single fuel nozzle 64 for receiving fuel from fuel source 32 via fuel line 66. Fuel nozzle 64 depicted in FIG. 1A is an "air-blast" type fuel nozzle especially advantageous for use with liquid fuel to provide atomization and thus enhance vaporization. However, use of an "air blast" nozzle with gaseous fuel can provide benefits in terms of providing an initial mixing of the fuel with air prior to admission to the venturi element which will be described hereinafter. Therefore, the combustion system of the present invention is not restricted to the use of liquid fuel or an "air-blast" fuel nozzle, but gaseous fuel and other types of fuel nozzles, such as swirling-type nozzles, can be used as well.

Fuel/air premixer 60 further includes mixing chamber means in the form of venturi 68 having venturi inlet 70 disposed within fuel/air premixer housing assembly 62 and venturi exit 72 connected to inlet port 43. Generally, venturi exit 72 should terminate flush with inlet port 43 and not protrude appreciably into combustion zone 54 for reasons that will be discussed hereafter. Venturi 68 defines a flow axis 74, and fuel nozzle 64 is positioned to deliver a fuel spray into venturi inlet 70 substantially along axis 74. The cross sectional flow area and dimensions of venturi 68 are chosen to provide vigorous and complete mixing of the fuel and compressed air within the venturi chamber and a directed flow of the resulting mixture along venturi axis 74 to combustion zone 54, such as indicated schematically by arrow 76. The flow area of venturi exit 72 should be chosen such that minimum velocities of the mixture (i.e., during idle) are greater than the flame propagation speed of the fuel/air mixture. Flame holder means such as depicted schematically as 78 may be provided proximate venturi exit 72 to enhance the stability of combustion in combustion zone 54.

It has been found that flame holders such as 78 may not be needed, as the high degree of mixing (and vaporization of liquid fuels) in the venturi and the low velocity at the venturi exit tend to provide stable combustion in the low velocity annular chamber defining combustion zone 54. In such applications, the substantial absence from the combustion zone 54 of internal structural appendages such as flame holders 78 or elements of the premixer 60 such as venturi exit 72 promotes a relatively "clean" combustion zone, that is, devoid of objects which could fragment or separate from connections and be carried downstream to cause damage or catastrophic failure in the turbine. Thus, the extremely clean and simplified construction of the combustor of the present invention is a further distinct advantage and benefit.

As best seen in FIG. 1B, mixing venturi 68 is disposed such that venturi axis 74 is oriented substantially tangentially with respect to housing axis 42 such that the incoming fuel/air mixture is caused to swirl about axis 42 within the combustion zone 54. It has been found using the preferred pre-mixer construction to be described in more detail henceforth that combustion chamber 52 can be adequately fed by using only a single fuel/air premixer fed by a single fuel nozzle. However, the present invention contemplates the possible use of multiple fuel/air premixers, particularly for situations wherein the radial "thickness" of combustion chamber 52 is small relative to the outer radius thereof, as measured from axis 42.

In accordance with one embodiment of the present invention, the combustor system includes an ignitor disposed on the cylindrical liner housing at a location adjacent the intersection of the flow axis of the venturi. With continued reference to FIG. 1B, ignitor 79 is positioned near the intersection of flow axis 74 and housing 40, and extends at most only a short distance into combustion zone 54. Ignitor 79 is thus ideally positioned to intercept the fuel/air mixture emanating from premixer 60 to initiate combustion. Once started, the swirling hot combustion gases in zone 54 will provide auto ignition of the fuel/air mixture and ignitor 79, which may be electrical, will normally be shut off.

Further in accordance with the present invention, compressed air conduit means are provided interconnecting the compressor exit and the fuel/air premixer for delivering a portion of the compressed air flow to the premixer compressed air receiving means and for delivering essentially the remaining portion of the compressed air flow to the aperture means for providing dilution air to the dilution zone and at the same time providing liner cooling. As embodied herein, and with continued reference to FIG. 1A, compressed air conduit means designated generally by the numeral 80 includes generally annular passageway 82 disposed between pressure housing 14 and housing 40. Passageway 82 extends between compressed air receiving plenum 30 and a ring-shaped plenum 84 and is formed as part of pressure vessel 14 adjacent the turbine exhaust section. Fuel/air premixer housing assembly 62 is connected to receive compressed air from plenum 84 for eventual communication to the venturi inlet 70 as explained previously. Plenum 84 is shown having a circular cross section but other shapes, configurations and locations are possible and are considered within the scope of the present invention.

As can be appreciated from the schematic in FIG. 1A, passageway 82 is configured such that the compressed air flowing therein provides cooling for housing 40, particularly housing portion 86 immediately surrounding the combustion zone 54 where the highest combustion temperatures are expected. Portion 86 of housing 40 is constructed for convection cooling only, with no film-cooling necessary. That is, in portion 86 of housing 40, the housing acts to seal off the compressed air flowing in passageway 82 from the fuel/air mixture being combusted in combustion zone 54. This construction provides for control of the fuel/air ratio of the mixture in combustion zone 54 and permits operation as a "single stage combustor" with a desired lean fuel/air ratio. Such an operation can yield low levels of $NO_x$ and unburned fuel and fuel by-product levels. As will be discussed henceforth, the particular construction of the combustor system of the present invention permits extraordinarily low levels of $NO_x$ in comparison with other state of the art combustion systems.

Passageway 82 essentially envelopes combustion chamber 52 to provide convection cooling and also to supply compressed air to dilution ports 58a and 58b. Passageway 82 also may include a channel 82a for channeling compressed air flow for cooling the portion of the pressure vessel 14 adjacent turbine 20, i.e., the turbine shroud, as is shown in FIG. 1A. Turbine inlet guide vanes 34 may be film cooled inlet guide vanes and may be fed from passageway 82 or 82a. Also, compressed air conduit means 80 can include a separate passageway 88 interconnecting the compressed air receiving plenum 30 and air-blast fuel nozzle 64 when such a nozzle is used, particularly with liquid fuel operation.

As would be understood from the foregoing discussion in conjunction with FIG. 1A, compressed air conduit means 80 acts to channel a portion of the compressed air flow to the fuel/air premixer 60 and to channel essentially the remaining portion of the compressed air flow to the dilution ports 58a and 58b. The compressed air flow not channeled to either the fuel/air premixer or the dilution ports, namely the air used to cool the inlet guide vanes 34, is very small and in any event does not disturb the fuel/air ratio in the combustion zone but merely results in a small further dilution of the exhaust gases prior to entry into turbine 20.

Further in accordance with one aspect of the present invention, valve means are disposed in the compressed air flow path for determining the compressed air flow rate to the premixer. The compressed air valve means is especially important where the speed of the compressor, and thus the volumetric flow rate of compressed air, is essentially independent of the fuel flow rate, such as the application depicted in FIG. 1A. As embodied herein and with continued reference to FIG. 1A, valve 90 is positioned in fuel/air premixer housing assembly 62 for determining the rate of compressed air flow from plenum 84 to venturi inlet 70. Valve 90 is continuously adjustable, and a suitable construction of valve 90 will be discussed in more detail hereinafter in relation to the description of one preferred construction of the fuel/air premixer of the present invention. When the valve opening changes, the pressure drop over the premixer changes, resulting in an increase or decrease of air mass flow to the dilution zone. Thus, this variation and dividing of the air flow happen outside the combustor proper.

Figure 2:
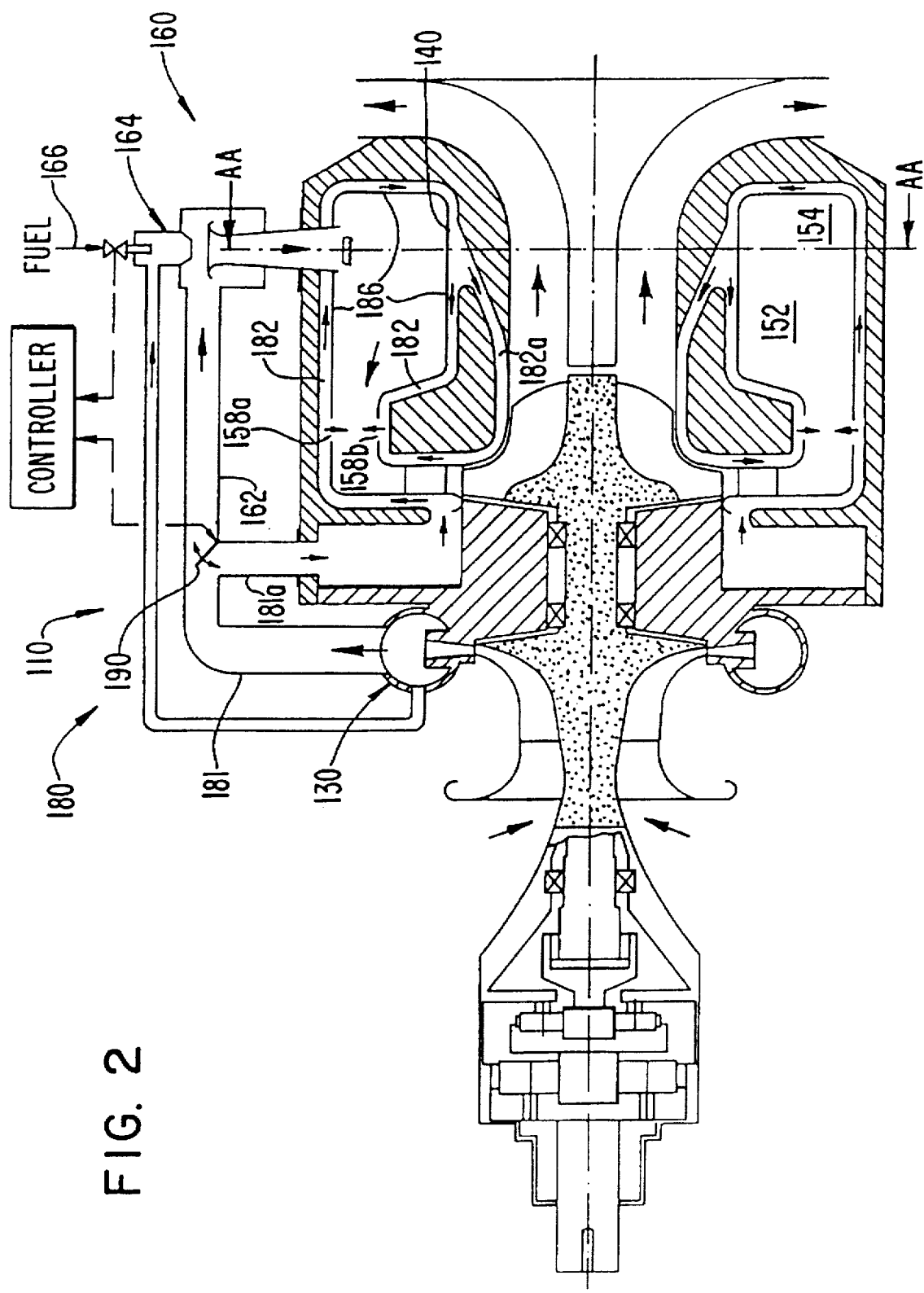
FIG. 2 is a schematic cross section of a gas turbine engine module with an alternative version of the combustor system shown in FIG. 1A.

FIG. 2 discloses combustor system 110 having an alternate configuration for the compressed air conduit means. Components having the same or similar function relative to the embodiment in FIGS. 1A, 1B are given the same numeral but with a "100" base. In the compressed air conduit means designated generally as 180 in FIG. 2, a distribution conduit 181 is provided between compressed air collection plenum 130 and annular passageway 182 surrounding housing 140, and fuel/air premixer housing assembly 162 is directly connected to distribution conduit 181 upstream of passageway 182. Valve 190 is disposed at the connection between fuel/air premixer housing assembly 162 and distribution conduit 181 to positively divide the air flow into a first portion flowing to fuel/air premixer 160 and the remainder to passageway 182 via distribution conduit portion 181a. As compared with the embodiment in FIG. 1A, where substantially all of the compressed air portion flowing to the premixer was first used to cool at least a part of liner housing portion 86 defining combustion chamber 52, none of the compressed air portion flowing to fuel/air premixer 160 is used to cool portions 186 of housing 140 defining combustion zone 152. However, the FIG. 2 embodiment does allow for the direct control of the compressed air fractions flowing to the fuel/air premixer versus the compressed air flow fraction flowing to the dilution ports 158a and 158b. The configuration shown in FIG. 1A may be preferred nonetheless because of an ease of construction in assembly of the various components, principally the fuel/air premixer wherein the valve can be integrated directly with the fuel/air premixer housing, as will be discussed in more detail henceforth.

Further in accordance with the present invention, fuel conduit means is provided interconnecting the fuel supply and the premixer fuel receiving means, the fuel conduit means together with the premixer fuel receiving means establishing a flow path for all the fuel to the premixer. Fuel valve means is disposed in the fuel flow path for determining the fuel flow rate therein. As embodied herein, and with reference again to FIG. 1A, fuel line 66 interconnects fuel source 32 with fuel nozzle 64. Fuel valve 92 is disposed in fuel line 66 immediately upstream of fuel nozzle 64, which is depicted as being an "air-blast" type fuel nozzle particularly suitable for use with liquid fuels, as stated previously.

Still further in accordance with the present invention, the combustor system includes controller means operatively connected both to the compressed air valve means and the fuel valve means for essentially controlling the respective flow rates of the compressed air portion and the fuel delivered to the premixer to provide a preselected lean fuel/air ratio mixture through the inlet port to the combustion zone.

As embodied herein and as depicted schematically in FIG. 1A, controller 94 which can be either mechanical or electric (e.g., a microprocessor) is interconnected with compressed air valve 90 to essentially control the flow rate of the compressed air flowing directly to venturi inlet 70. While a small portion (typically 5% or less), of the total compressed air flowing to fuel/air premixer 60 can travel through conduit 88 when an "air-blast" nozzle is utilized, the control provided by valve 90 of the remaining 95+% of the compressed air flow is expected to achieve adequate overall fuel/air ratio control. Moreover, for situations utilizing gaseous fuel, such as natural gas as provided in the Example to be discussed hereinafter, conduit 88 could be eliminated such that all of the compressed air flow to the fuel/air premixer will be under the control of the compressed air flow valve.

Also as depicted in FIG. 1A, controller 94 is operatively connected to fuel valve 92 to meter the fuel flow to fuel nozzle 64. As one skilled in the art would appreciate, controller 94 can act to control both the fuel flow and the compressed air flow to fuel/air premixer 60 to achieve a single preselected fuel/air ratio mixture over the entire operating range of the gas turbine engine module so that the mass flow of the combustible mixture would change as a function of the load. Or, alternatively, controller 94 can be configured to provide a sequence of preselected fuel/air ratio mixtures as a function of load. One skilled in the art would be able to select and adapt a suitable controller for a particular application based on the present disclosure and the general knowledge in the art.

In operation, and with reference to FIGS. 1A and 1B, compressed air from compressed air receiving means 30 is channeled via passageway/envelope 82 over the outside surface of housing 40 for cooling housing 40, and particularly portions 86 which surround combustion zone 54. A portion of the compressed air flowing in passageway 82 is admitted to plenum 84 and then flows to fuel/air premixer 60 via the interconnection between fuel/air premixer housing assembly 62 and 84 as controlled by compressed air valve 90 via controller 94. In venturi 68, the compressed air portion is mixed with the fuel from fuel nozzle 64, possibly with a small additional portion of compressed air if nozzle 64 is a "air-blast" type nozzle, and is injected along the venturi axis 74 through inlet port 43 and into combustion zone 54 of combustion chamber 52.

As shown in FIG. 1B, swirling flow and combustion is provided in combustion zone 54 by locating venturi axis 74 tangentially with respect to axis 42 of the housing. The direction of orientation of the venturi axis 74 is chosen to give a specific angular direction (clockwise or counterclockwise) with respect to the direction of rotation of the turbine in order to provide some aerodynamic unloading of the inlet guide vanes. For the configuration depicted in FIG. 1A and 1B where the fuel/air mixture is admitted to achieve a clockwise swirling combustion in combustion zone 54 as viewed in the direction AA, the direction of rotation of turbine 20 also would be in the clockwise direction. After combustion of the fuel/air mixture in zone 54, the hot exhaust gases pass to dilution zone 56 where dilution air from dilution ports 58a, 58b reduce the average temperature of the exhaust before it is ducted via channel 50 past inlet guide vanes 34 to turbine 20 for work-producing expansion.

The control of combustion afforded by combustion system 10 in accordance with the present invention through the complete mixing of the fuel and air outside the combustion chamber in the fuel/air premixer, including complete vaporization of the fuel if liquid fuel is used, together with the control of the fuel/air ratio of the mixture delivered to the combustion chamber allows for significant reductions in NO$_x$ levels and the levels of unburned fuel and fuel by-products, as mentioned earlier. Furthermore, the utilization of essentially the total amount of compressed air flow to either combust the fuel or to dilute the exhaust gases upstream of the turbine provides considerable reduction of peak combustor temperatures resulting in longer life for combustor liners compared to conventional combustor designs.

As previously mentioned, the preferred fuel/air premixer of the present invention includes a compressed air receiving means, a venturi having an inlet operatively connected to the compressed air receiving means with air flow smoothing means, a fuel receiving means including a nozzle with an exit positioned to deliver a spray of fuel into the venturi inlet substantially along the venturi axis, and valve means associated with the compressed air receiving means for determining the compressed air flow rate to the venturi inlet. As embodied herein and with reference to FIG. 3A, fuel/air premixer 260 includes air receiving means in the form of housing assembly 262. Components having a like or similar function to those disclosed in the embodiments of FIGS. 1A and 1B will be designated by the same numeral but with a "200" base. Housing assembly 262, in turn, includes housing 300 and housing support 302 for mounting housing 300 on pressure vessel 214 of gas turbine engine module 212. Housing support 302 is hollow and, in addition to supporting housing 300 and the components contained therein, acts to channel compressed air from plenum 284 to housing 300. In the construction shown in FIG. 3A, cooling shroud member 303 is positioned between combustion chamber liner housing 240 and pressure vessel 214 for establishing the flow path 282, at least in the vicinity of portions 286 of housing 240 that define the boundary of the combustion zone 254. Shroud member 303 also defines with pressure vessel 214, plenum 284 for collecting the compressed air portion for eventual transmission to housing 300 via housing support 302.

Figure 3A:
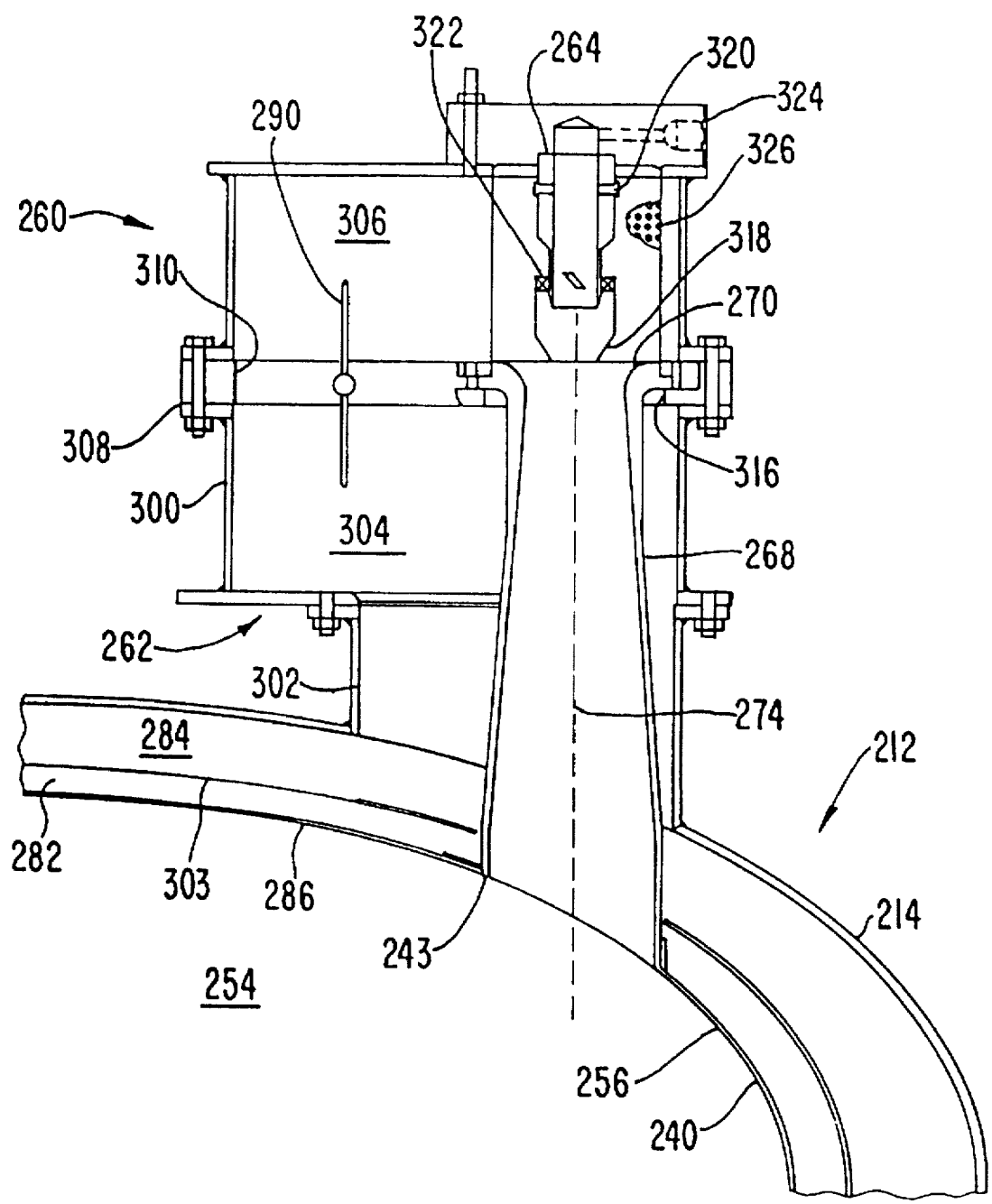
FIGS. 3A–3C are detailed cross sectional views of a test version of the preferred fuel/air premixer component of the apparatus shown in FIG. 1A.

With continued reference to FIG. 3A, fuel/air premixer housing 300 is divided into upstream and downstream compartments 304, 306 respectively by divider plate 308. Aperture 310 is provided in divider plate 308, and a butterfly-type valve plate 290 is mounted for rotation in aperture 310. In the FIG. 3A embodiment, the orientation of valve plate 290 in aperture 310 is controlled through control arm 312 (see FIG. 3B) to provide a selective degree of obstruction and, hence, pressure drop. In the orientation of valve plate 290 shown in FIGS. 3B and 3C, a minimum amount of obstruction occurs with valve plate 290 being oriented perpendicular to the divider plate 308, corresponding to a "zero" setting of the angular calibration plate 314 shown in FIG. 3C. A position of control rod 312 corresponding to either "9" position on indicator 314 would result in the greatest amount of obstruction and pressure drop in the compressed air portion flowing through aperture 310. As one skilled in the art would realize, the degree of obstruction and thus control of the compressed air flow between upstream compartment 304 and downstream compartment 306 could be varied by changing the angular orientation of control rod 312 between the "zero" and "9" positions thereby controlling the compressed air flow rate to the balance of the fuel/air premixer 260 which will now be described in more detail.

Divider plate 308 includes an additional aperture 316 in which is mounted inlet 270 of venturi 268. Venturi inlet 270 is configured and mounted to divider plate 308 such that a smooth transition exists between the upper planar surface of divider plate 308 and the inner surface of venturi inlet 270. Venturi 268 extends through upstream housing compartment 304, housing support 302, past pressure vessel 214, combustion chamber liner 303, and connects to housing 240 at the location of inlet port 243. As described previously in relation to the embodiment depicted in FIG. 1A, the venturi axis 274 which corresponds generally to the flow direction of the fuel/air mixture in venturi 268 is oriented to provide a substantially tangential admission direction with respect to the axis (not shown) of annular combustion chamber housing 240.

With continued reference to FIG. 3A, fuel nozzle 264 is mounted in downstream compartment 306 with the fuel nozzle exit 318 positioned to deliver a spray of fuel into venturi inlet 270 along venturi axis 274. Fuel nozzle 264 is of the "swirling" spray type which utilizes ports 320 and swirl vanes 322 to channel some of the compressed air to swirl the fuel entering through fuel port 324 before releasing the fuel spray through exit 318. Also shown in FIG. 3A is perforated flow-smoothing element 326 positioned in the downstream compartment 306 and surrounding fuel nozzle exit 318 and venturi inlet 270, to avoid uneven velocities and separation in the venturi which otherwise could result in "flame holding" in the venturi. While a small pressure drop is introduced by its incorporation, the perforated element 326 has been found to provide increased stability for the compressed air flow from downstream compartment 306 past the fuel nozzle 264 and into venturi inlet 270, without any separation at the lip of venturi inlet 270.

Figure 3B:
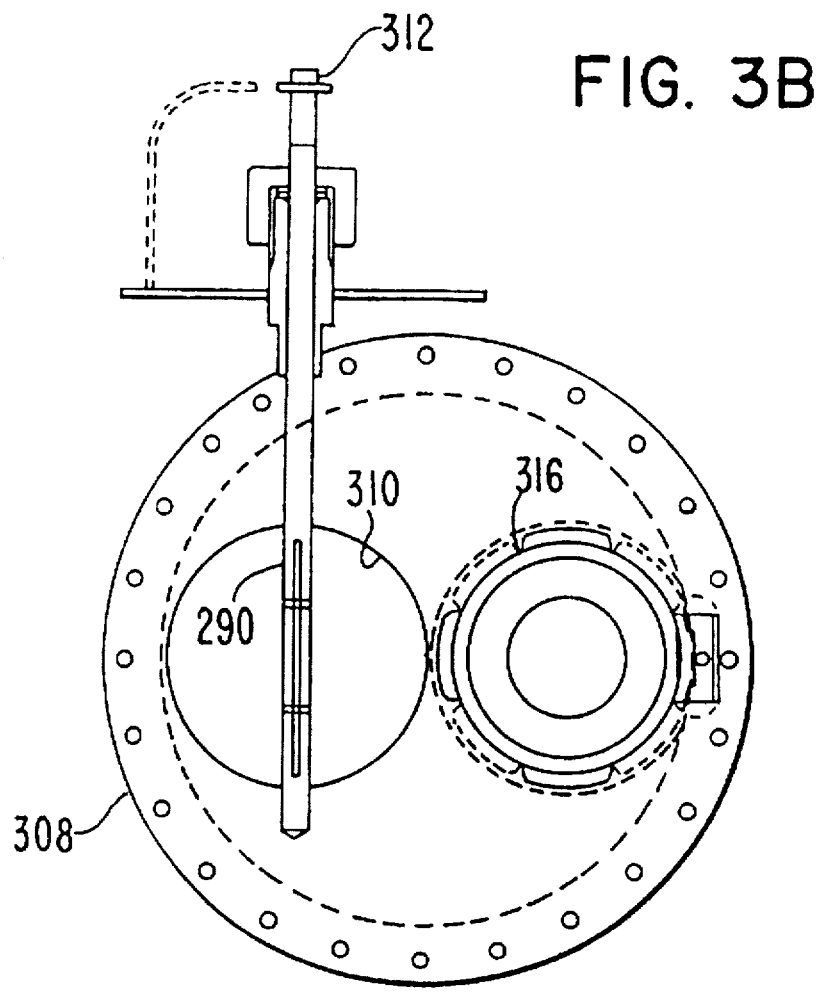
Figure 3C:
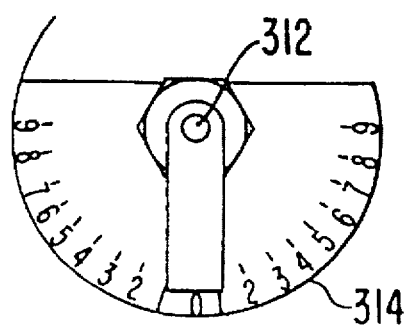
Figure 4:
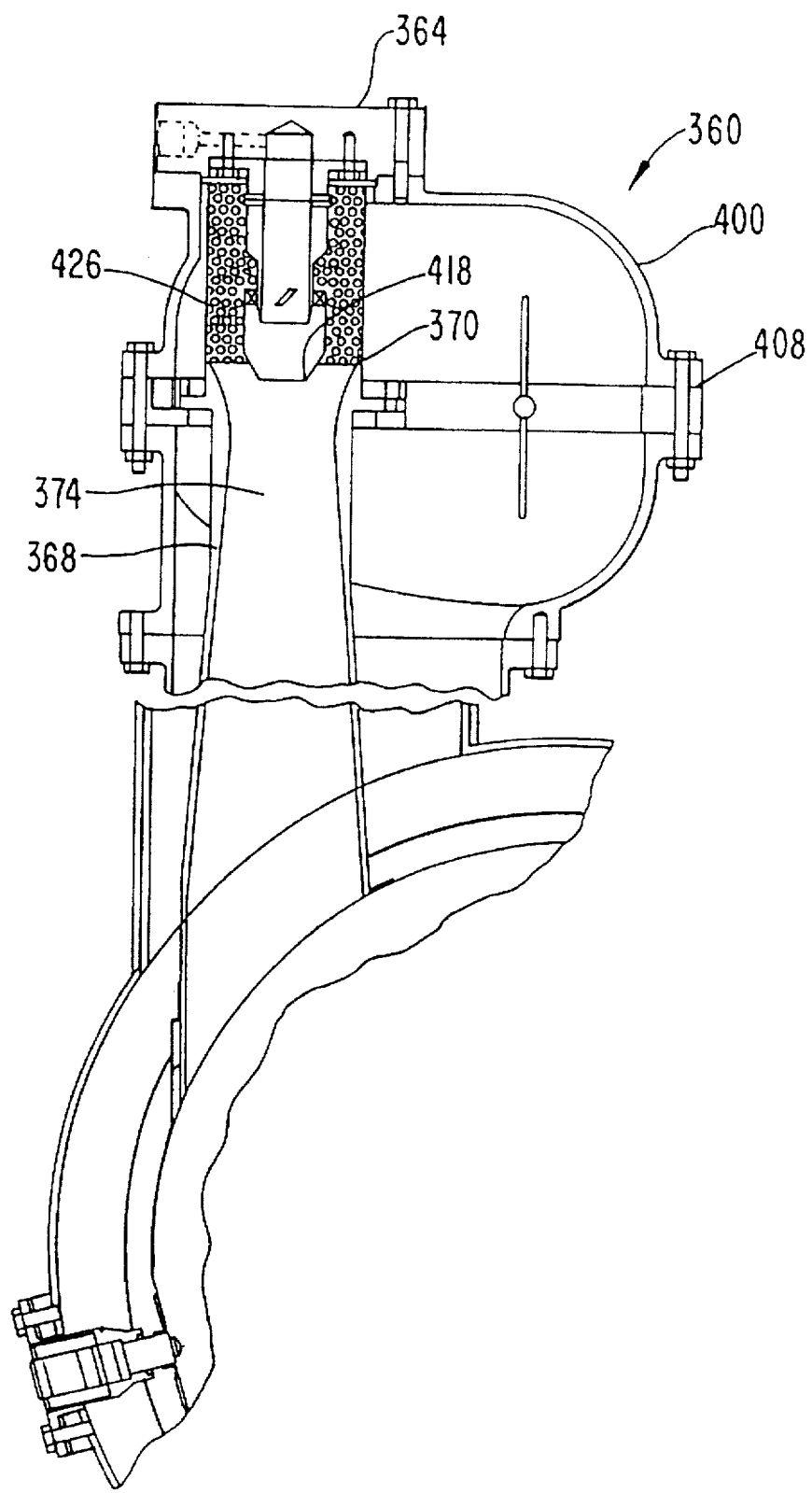
FIG. 4 is a detailed cross sectional view of an engine version variation of the fuel/air premixer shown in FIGS. 3A–3C.

FIG. 4 shows a contemplated commercial variation of the fuel/air premixer depicted in FIGS. 3A–3C, which variation is designated generally by the numeral 360. Components having the same or similar function to those described in relation to the FIG. 1A, 1B embodiment are given the same numerals but with "300" base. Fuel/air premixer 360 includes a venturi 368 which has inlet 370 which extends slightly above the surface of divider plate 408. Also, fuel nozzle exit 418 extends a distance into venturi inlet 370. One skilled in the art would realize that the optimum performance of the fuel nozzle 364 in conjunction with the venturi 368 (as well as nozzle 264 and venturi 268 in the variation shown in FIGS. 3A–3C) may vary from application to application and that the positioning of fuel nozzle exit 418 along the venturi axis 374 in the vicinity of venturi inlet 370 may be adjusted to determine the optimum position. However, it is anticipated that perforated screen element 426 would provide flow stability for the FIG. 4 embodiment as well. Finally, the FIG. 4 embodiment incorporates contemplated refinements in the construction of the fuel/air premixer compared to the construction shown in FIG. 3A, such as the use of integral, bell-shaped housing 400.

Figure 5A:
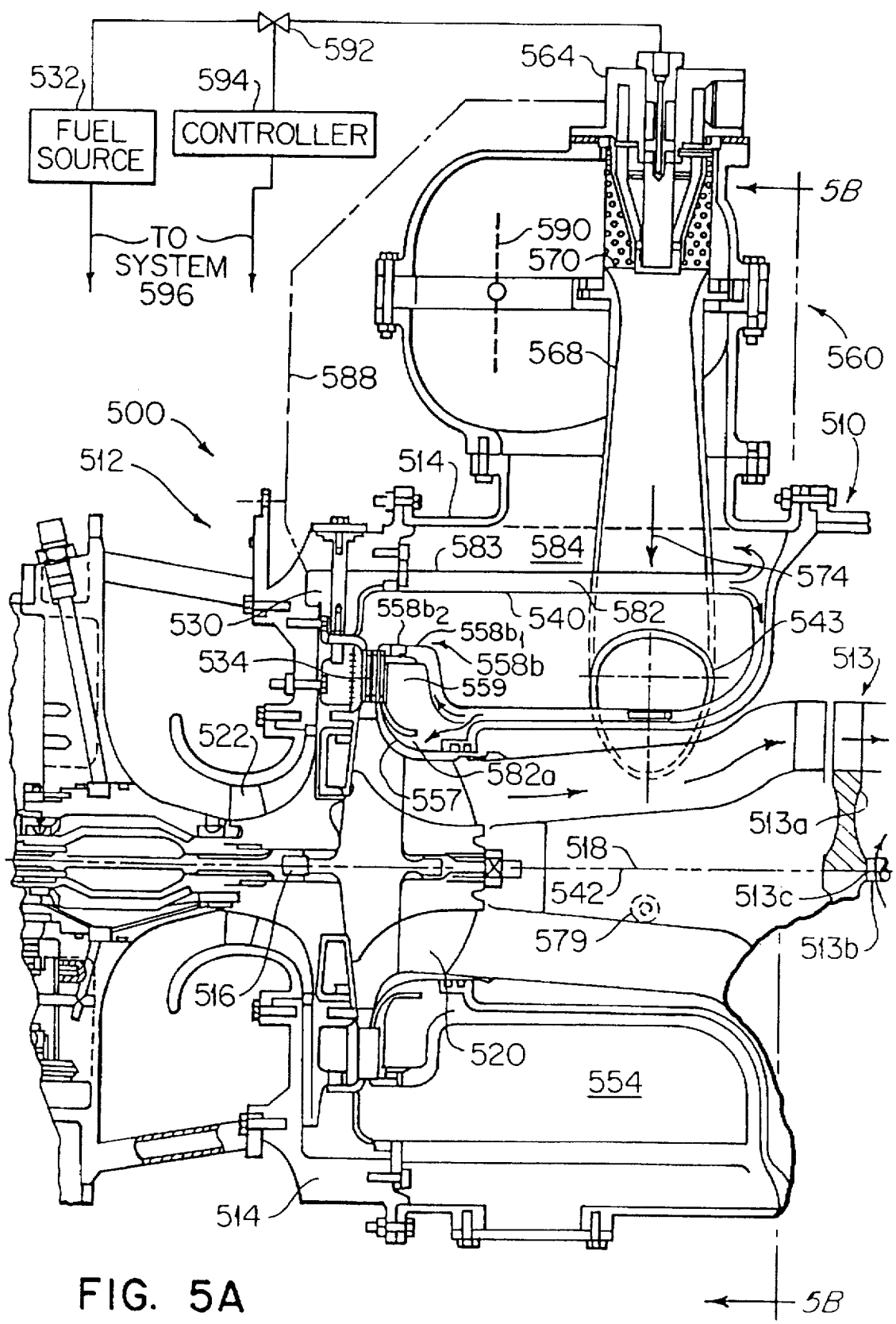
FIG. 5 is a cross-sectional schematic of another gas turbine engine module utilizing a combustor system made in accordance with the present invention.

As mentioned previously, certain aspects of the present invention advantageously can be adopted for applications such as gas turbine gas generator modules used in conjunction with free power turbines or free jet propulsion units, which gas generator modules may not require the use of a compressed air flow valve and associated controller functions, in contrast to the previously discussed embodiments depicted in FIGS. 1A and 2. FIG. 5A depicts schematically such an engine system constructed in accordance with the present invention and designated generally by the numeral 500. Engine 500 comprises gas turbine gas generator module 512, including combustor system 510 to be discussed in more detail hereinafter and free power turbine module 513. Free turbine module 513 includes free turbine 513a which is depicted as an axial turbine, but could be pure radial or mixed axial-radial as the application may require. In comparison with the FIG. 1A engine system embodiment where power was extracted from gearing 24 connected to shaft 16, power is taken from the engine system 500 in the FIG. 5A embodiment via gearing associated with free turbine shaft 513b. Although shown coaxial with axis 518 of the gas generator module, rotational axis 513c of free power turbine 513 could be angularly displaced to meet the requirements of the overall system 500.

In the subsequent discussion, like components relative to the embodiment in FIG. 1A will be given the identical numeral but with a "500" prefix.

In accordance with the present invention gas turbine gas generator module 512 includes a mechanically independent spool, namely centrifugal compressor 522 and radial turbine 520 mounted for dependent rotation on shaft 516, inside pressure housing 514. Thus, shaft 516 can rotate independently of free turbine shaft 513b although gas generator 512 and free turbine module 513 are interconnected in the gas flow cycle. Module 512 also includes combustor system 510 with combustor liner housing 540 which is contained within pressure housing 514 and which receives premixed air/fuel from external premixer 560 through inlet port 543 along venturi axis 574. Venturi axis 574 is oriented tangentially with respect to axis 542 of annular combustor liner housing 540 to provide efficient, swirling combustion and also to partially unload inlet guide vanes 534, as discussed previously in relation to the FIG. 1A embodiment. See FIG. 5B.

Figure 5B:
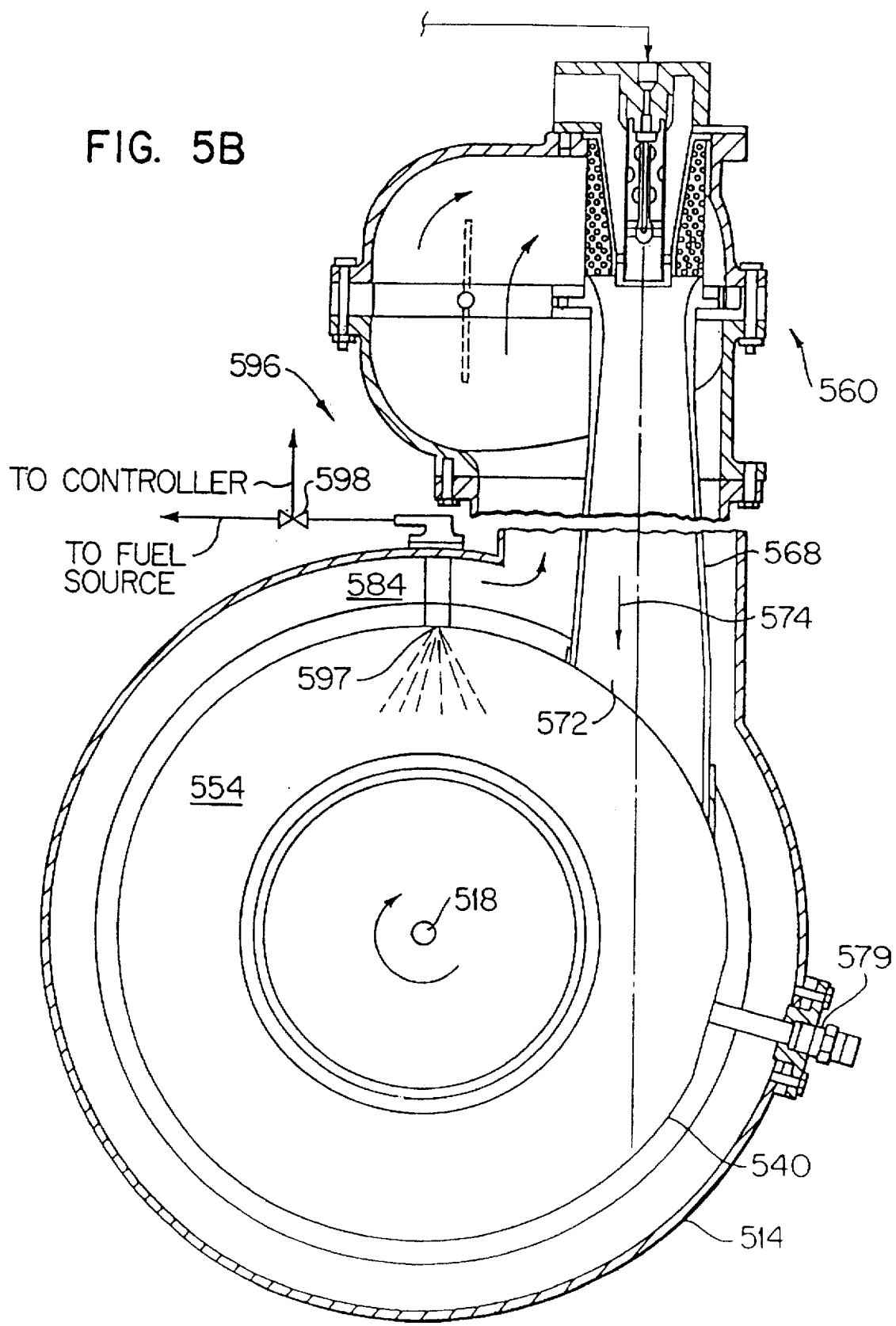

FIG. 5B also depicts the presently preferred position of ignitor 579, namely on liner housing 540 adjacent the intersection of venturi axis 574. Tests have shown that it is possible to locate the ignitor in the relatively cooler environment, in the premixer, venturi and thereby prolonging ignitor life and further decrease the number of penetrations in liner housing 540. The location depicted in FIG. 5B will also ensure light-off because of the low velocities of the fuel/air mixture in the annular chamber.

In the embodiment depicted in FIGS. 5A and 5B, housing liner 540 and pressure housing 514 cooperate to form passages for the compressed air flow from compressor plenum 530. Also included in this engine embodiment is annular cooling shroud 583 disposed between, and radially spaced from both, housing liner 540 and the circumferentially adjacent portion of pressure housing 514. As can be appreciated from the figures, cooling shroud 583 and housing liner 540 cooperate to form part of the passageway 582 for convectively cooling the combustor chamber defined by liner 540 while cooling shroud 583 and pressure housing 514 cooperate to form annular plenum 584 to collect the portion of the compressed air flow to be channeled to premixer 560 for mixing with the fuel. In the FIG. 5A embodiment, as in the embodiment shown in FIG. 1A, a portion of the compressed air is taken from the passageway leading from the compressor exit after providing convective cooling and is then channeled to the premixer for mixing with fuel, but the FIG. 5A arrangement can be made more structurally compact than the ring-shaped plenum 84 in FIG. 1A. Furthermore, cooling shroud 583 provides radiation shielding of the adjacent parts of pressure housing 514 from the relatively hot liner housing 540, allowing the use of less expensive materials and increasing the service life of the pressure housing.

The balance of the compressed air flow in passageway 582 is channeled through dilution apertures 558b. There are no dilution ports corresponding to the ports 58a in the FIG. 1A embodiment, but dilution ports 558b include two separate circumferential port sets $558b_1$ and $558b_2$. Divider 559 and the sizing of ports $558b_1$ and $558b_2$ causes dilution air flowing through ports $558b_2$ to first flow through passageway 582a past turbine shroud 557. One skilled in the art would be able to perform the required sizing analysis to provide adequate distribution of the dilution air to achieve desired turbine shroud cooling. The elimination of film cooling provides for control over the fuel/air ratio in the combustion zone 554 and is one of the highly significant benefits and advantages of the present invention, as explained previously.

FIG. 5A also shows (in dotted line) conduit 588 leading from compressor exit planum 530 to premixer 560 in the event "air-blast" type liquid fuel nozzle is utilized, for reasons explained previously. Although shown penetrating compressor plenum-exit 530 axially inclined in FIG. 5A for clarity, the inlet to conduit 588 would be tangential and in the axial plane of the compressor exit to capture the total dynamic head. One skilled in the art would be able to design an appropriate inlet configuration given the present description.

Aside from the small amount of compressed air that may be required to enhance the effectiveness of an air blast-type liquid fuel nozzle or further improve gas fuel/air mixing and, possibly, for inlet guide vane cooling, all of the compressed air is used to convectively cool at least part of liner housing 540 before being used for mixing with the fuel or for dilution. This construction optimizes the convective cooling capacity of the compressed air inventory. Although not shown, the present invention is also intended to include a gas generator variation corresponding to the FIG. 2 embodiment where the compressed air flow portion used for mixing with the fuel is not first used for convective cooling. The simplified construction of such a system might outweigh the reduction in cooling capacity and therefore be desired for certain applications.

As depicted in FIG. 5A, air is channeled from passageway 582 through annular plenum 584 for mixing directly with the fuel in premixer 560. FIG. 5A depicts compressed air valve 590 by broken lines to indicate that the valve is optional. It may be used for "fine tuning" the fuel/air ratio during operation, it may be preset to a fixed opening for operation, or it may be eliminated entirely, for the following reason. In engine system 510, the speed of compressor 522 and thus the compressed air flow rate is essentially proportional to the fuel flow over the operating range. Hence, gross control of the fuel/air ratio to a preselected lean value can be achieved automatically. The function of controller 594 acting to control fuel flow to fuel nozzle 564 from source 532 through fuel valve 592 thus becomes similar to that of a conventional throttle responsive to power demands.

While premixer 560 channels all the fuel/air mixture to combustion zone 554 required over the intended operating range of engine system 510, an auxiliary fuel supply system such as system 596 depicted in FIG. 5B may be used to provide a richer mixture for start-up and idle conditions. System 596 includes a conventional fuel spray nozzle 597 fed from fuel source 532 (see FIG. 5A), and the auxiliary fuel flow rate can be controlled by controller 594 through valve 598. In the disclosed embodiment, spray nozzle 597 is positioned to penetrate liner housing 540 adjacent venturi outlet 572 and disposed radially. However, nozzle 597 can be positioned in an opposed tangential orientation relative to venturi 568 (not shown) to enhance mixing with the fuel/air mixture entering through venturi 568. Other positions, constructions and orientations of spray nozzle 597 are, of course, possible and are considered to fall within the general teachings herein.

Figure 6A:
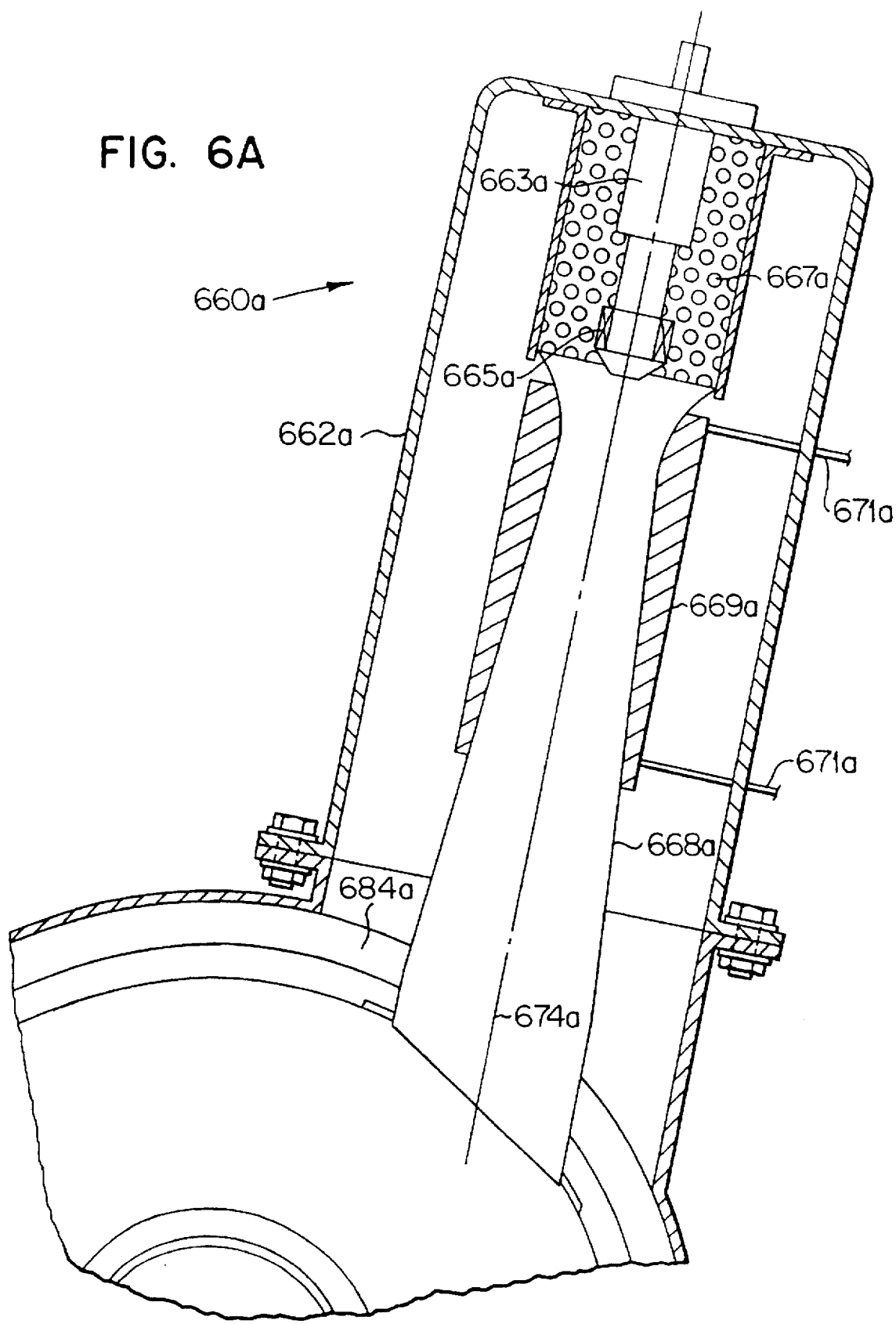
FIGS. 6A–6C are schematic cross sections of alternative premixer constructions for use in the gas turbine engine modules made in accordance with the present invention.
Figure 6B:
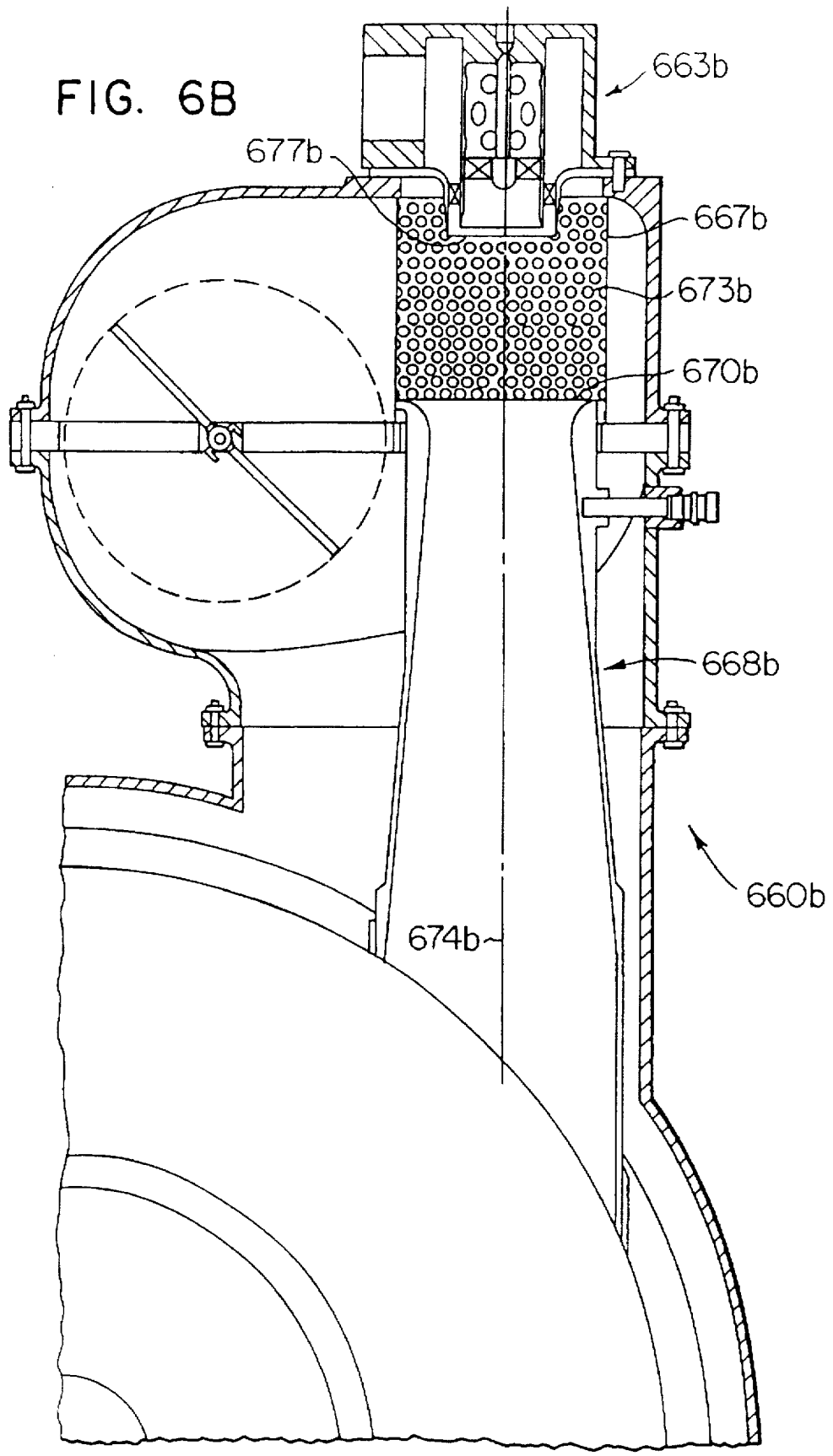
Figure 6C:
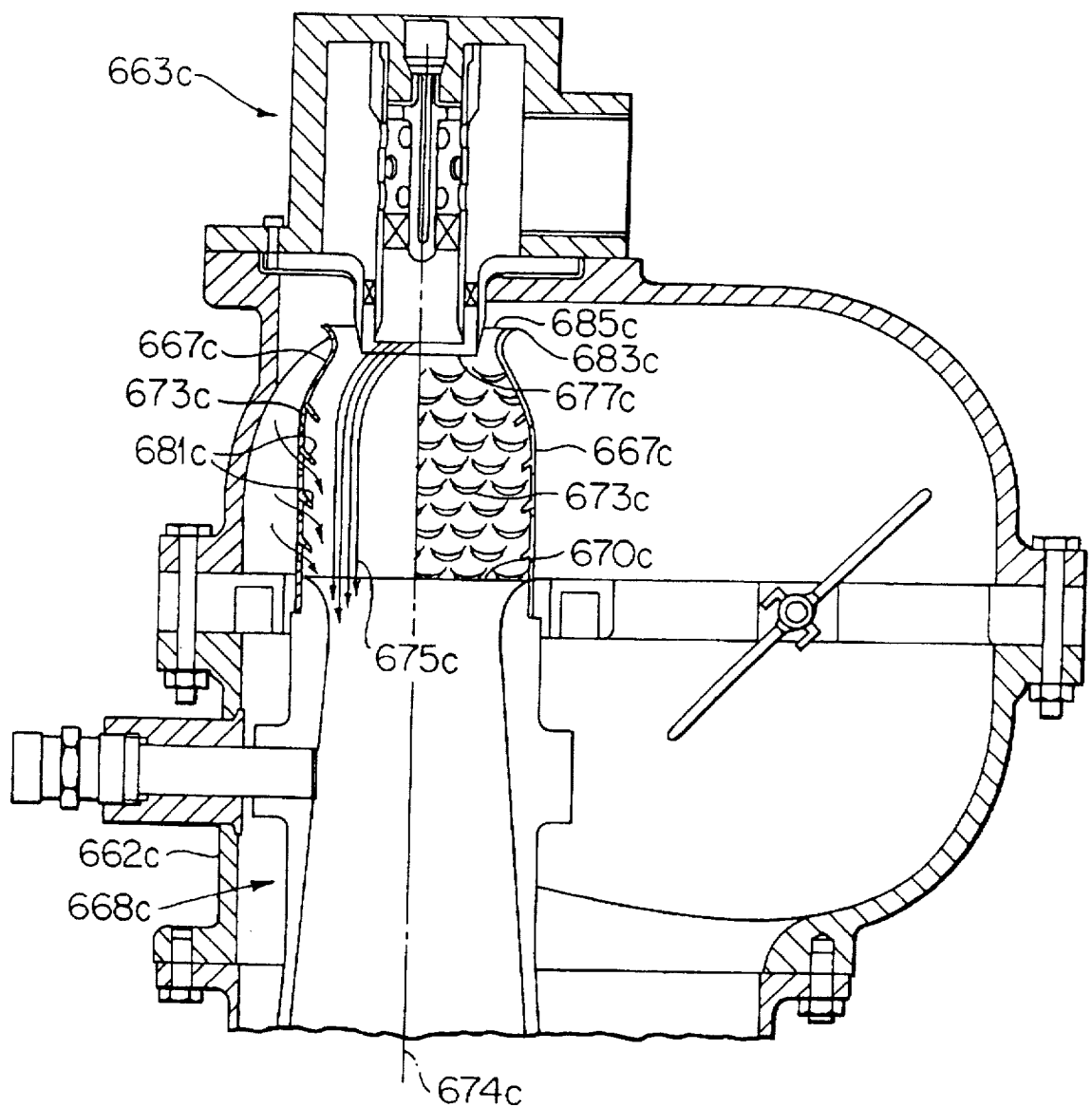

FIGS. 6A–6C are schematics of alternative premixer constructions which could be used in gas combustor systems for gas turbine modules, in accordance with the present invention. FIG. 6A shows a "valve-less" design suitable for engine system 510, and which is designated generally by the numeral 660a. Premixer 660a includes housing 662a, fuel nozzle 663a which is of the type having peripheral swirl vanes 665a, and venturi 668a oriented with venturi axis 674a tangential to the combustor axis (not shown). Also, perforated flow-smoothing member 667a surrounds nozzle 664a and the entrance to venturi 668a, for reasons explained previously in relation to the corresponding components in the "valved" embodiment in FIG. 3A. Premixer 660a additionally includes heating means such as electric resistance heater jacket 669a surrounding the throat area of venturi 668a and operatively connected to a power source (not shown) via electrical leads 671a. During start up and using liquid fuels, a film of fuel tends to collect on the venturi inner surface. Heater jacket 669a should augment vaporization of this fuel film and thus promote the overall mixing of the fuel and air in the premixer. During operation, the temperature of the compressed air portion flowing past the outer surface of venturi 668a from plenum 684a may provide sufficient heat for vaporizing a liquid film, or prevent the formation of a liquid fuel film altogether, thereby dispensing with the need for continued activation of heating jacket 669a.

FIGS. 6B and 6C depict premixer configurations that provide increased mixing in the premixer without increasing the length of the venturi, which can be advantageous during the use of liquid fuels. As is depicted schematically in FIGS. 6B and 6C, the nozzle exit can be spaced from the venturi inlet along the direction of the venturi axis up to the entire axial length of the flow smoothing element. This arrangement allows a greater opportunity for the individual liquid fuel particles to mix with the incoming air and vaporize.

Importantly, constructions such as shown in FIGS. 6B and 6C allow the flow smoothing element to provide the further function of minimizing impingement of the liquid fuel particles on the inner surface of the venturi where they might otherwise coalesce causing unwanted fuel streaming and possibly flame-holding in the venturi. Typical fuel nozzles such as atomization spray nozzles and "air blast" nozzles impart a radially outward velocity component to fuel droplets which could reach the inner venturi surface. In the FIGS. 6B and 6C embodiments, the individual perforations impart a radial inward velocity component to the stream of combustion air which tends to oppose the radial outward movement of the fuel particles emanating from the nozzle. The effect of the radial inward flow of the combustion air should provide a gradual turning of the fuel droplets into a predominantly axial direction, as is depicted in FIG. 6C by the flow lines 675c, while maintaining good dispersion across the venturi cross-sectional flow area. A further expected benefit of the radial counterflow between the combustion air and the liquid fuel particles is increased mixing due to the shearing action of the air on the fuel particles.

Both the shape of the flow smoothing element and the configuration (cross-sectional shape, size, orientation, distribution, etc.) of the individual perforations can be tailored to augment the ability of the premixer to promote more complete vaporization and decreased liquid fuel streaming. For reasons given previously, at least some of the perforations, particularly those immediately downstream of the fuel nozzle exit should have configurations that provide radial or mixed radial and axial combustion air flow. It is presently preferred that the perforations not have configurations that impart a tangential velocity (swirling) component to the air stream. The centrifugal force on the fuel particles by such a swirling airstream may increase fuel droplet impingement and streaming. However, perforation configurations which induce oppositely directed swirling could be provided if the fuel nozzle used is of the type that produces a swirling spray pattern to the fuel droplets. In this particular case, the anti-sense swirl relative to the swirl direction of the fuel spray (e.g., counterclockwise if the fuel spray is clockwise, or vice versa) could promote mixing and vaporization.

With continued reference to the drawings, FIG. 6B depicts premixer 660b with "air blast" fuel nozzle 663b, venturi 668b, and smoothing element 667b. Generally, element 667b has the shape of a right circular cylinder with circular perforations 673b radially oriented. Perforations 673b in the particular embodiment shown in FIG. 6B have diameters of, typically, 0.5 to 3 mm, and are arranged on a constant pitch at least sufficient to provide mechanical integrity of element 667b, but other combinations of perforation size and distribution can be used depending on the particular application, as one skilled in the art would readily understand, given this disclosure. Also, other fuel nozzle types could be used in place of "air blast" nozzle 663b to provide an even, relatively small droplet size. As shown in FIG. 6B, nozzle exit 677b is spaced from venturi entrance 670b along venturi axis 674b to allow the incoming air to turn the fuel droplets in the axial direction and increase mixing and vaporization.

Premixer 660c shown in FIG. 6C also has an "air blast" type fuel nozzle (nozzle 663c) with exit 667c spaced from entrance 670c of venturi 668c along venturi axis 674c. Smoothing member 667c in FIG. 6C is dome shaped having an open, reduced diameter end 683c defining annular flow passage 685c surrounding fuel nozzle exit 677c. Annular passage 685c allows a portion of the combustion air to bypass the flow smoothing element 667c and establish an annular curtain of air flowing past nozzle exit 677c generally in the axial direction.

The individual perforations 673c are generally crescent shaped and have inwardly angled radial orientation. Flow smoothing member 667c includes lip members 681c formed on the inner surface adjacent the upper edges of the individual perforations and inclined to the venturi axis by approximately 45°. Any fuel droplets reaching the flow smoothing member inner surface would tend to stream off lips 681c and become entrained by the air flow through the perforations before reaching the venturi entrance.

Also shown in the premixer embodiments pictured in FIGS. 6B and 6C are respective ignitors 687b, 687c associated with venturis 668b, 668c. With specific reference to FIG. 6C, ignitor 687c is mounted in housing 662c and penetrates the wall of venturi 668c downstream of the throat. Although the average velocities in venturi 668c are such as to prevent flame holding, ignitor 687c is configured to achieve a substantially flush profile with the venturi inner wall to minimize eddy formation. Following ignition, the fuel/air mass should travel to the combustion chamber where stable flame holding will occur.

Figure 7:
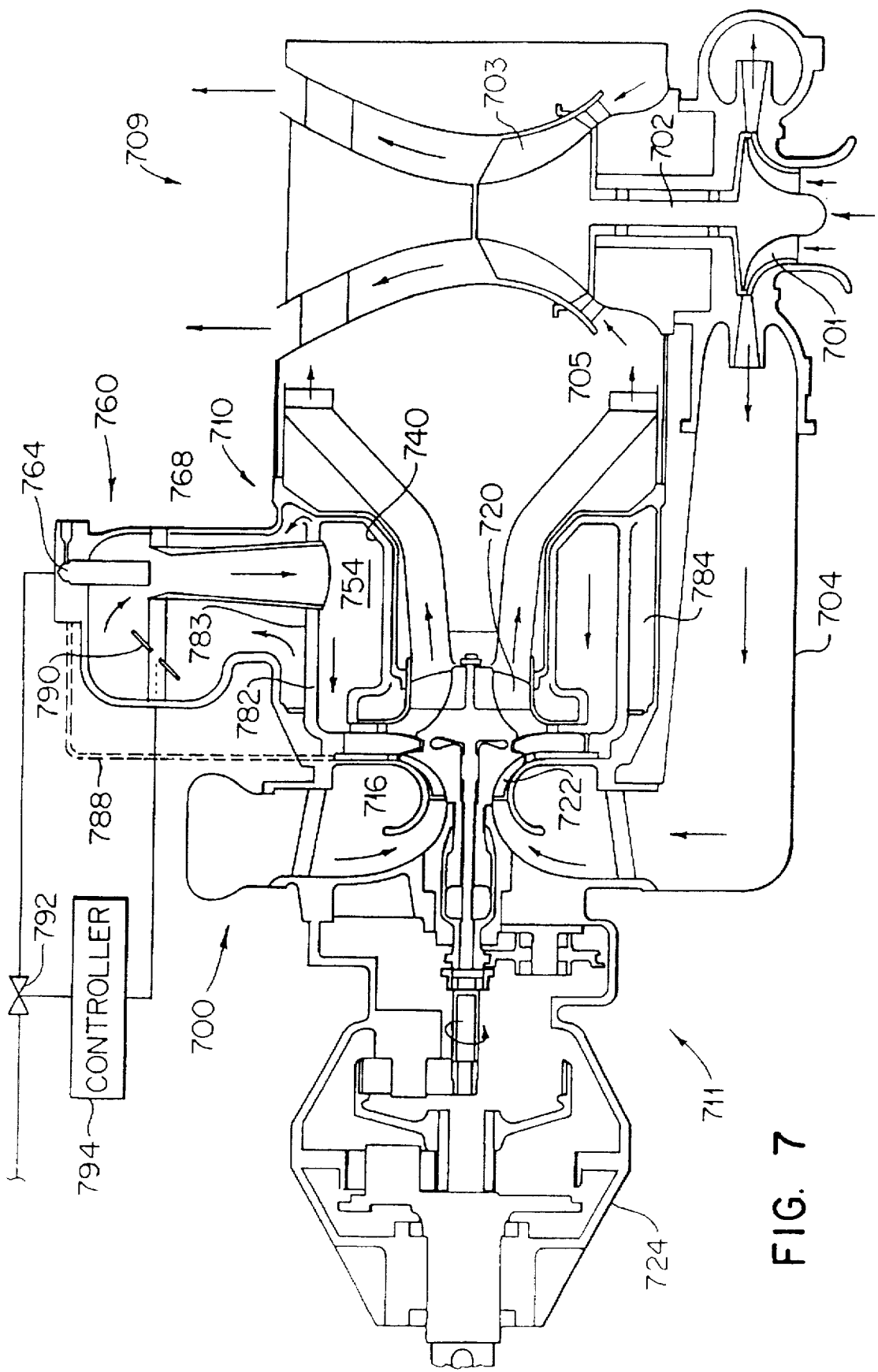
FIGS. 7 and 8 are schematic cross-sections of other gas turbine engine modules using combustor systems made in accordance with the present invention.
Figure 8:
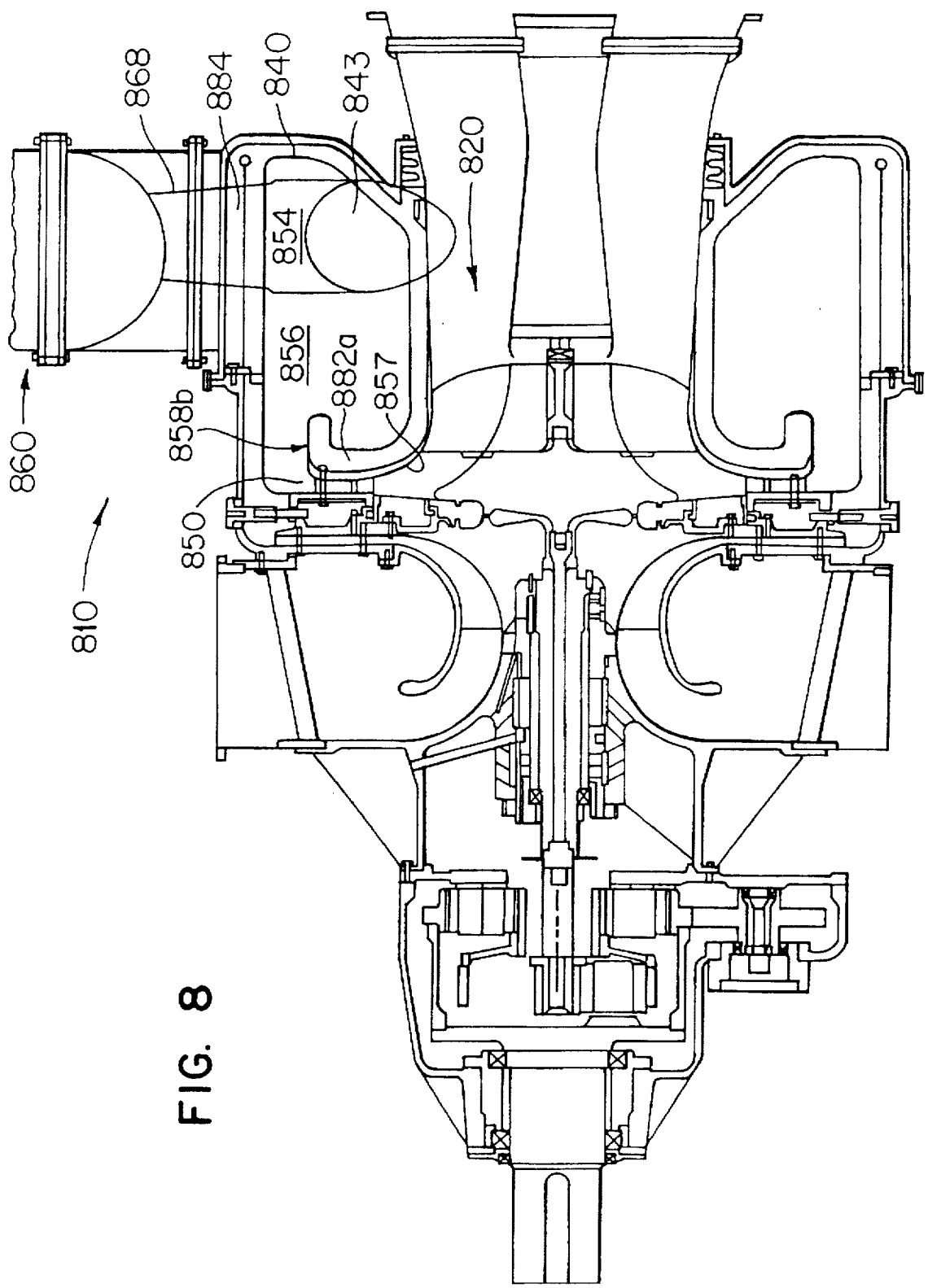

The premixer embodiments shown in FIGS. 6B and 6C include compressed air valves and advantageously can be used in gas turbine modules of the type shown in FIGS. 1A, 7 and 8. The premixer configurations in FIGS. 6B and 6C can also be used in the FIG. 5A module with a preset valve opening or without the valve (in a "valve-less" design), for reasons explained previously in relation to the FIG. 6A premixer embodiment. Moreover, although not shown, venturi heating elements similar to element 669a in FIG. 6A could be used in the FIGS. 6B and 6C configurations to promote vaporization.

FIG. 7 schematically depicts yet another engine embodiment that may advantageously utilize the combustor of the present invention, namely, a gas turbine engine system such as described in my previous patent U.S. Pat. No. 5,081,832, the disclosure of which is hereby incorporated by reference. In the FIG. 7 embodiment, engine system 700 includes high pressure spool 711 and mechanically independent low pressure spool 709. Low pressure spool 709 includes low pressure compressor 701 which is driven through shaft 702 by low pressure turbine 703. The compressed air exiting low pressure compressor 701 flows through diffuses 704 and enters high pressure compressor 722 for further compression. As components of high pressure spool 711 high pressure compressor 722 is driven by high pressure turbine 720 via shaft 716. Gases exhausted from high pressure turbine 720 are diffused in diffuser 705 and then expanded in low pressure turbine 703. For reasons explained more fully in U.S. Pat. No. 5,081,832, net power is taken from engine system 700 via gearing 724 connected to shaft 716 of high pressure spool 711. Low pressure spool 709 is used principally to supply pre-compressed air to high pressure spool 711 and possibly to drive engine support systems (e.g., lubrication).

As seen in FIG. 7, engine system 700 includes combustor system 710 to provide hot combustion gases to high pressure turbine 720 by combusting fuel with a portion of the compressed air from high pressure compressor 722. Importantly, combustor system 710 uses external premixer 760 which includes fuel nozzle 764 (which may be an "air-blast" type receiving compressed air directly from compressor 722 via conduit 788 with a tangential inlet-shown dotted) and venturi 768 to supply fully premixed fuel/air tangentially to annular combustion zone 754 defined by liner housing 740. Cooling shroud 783 and liner housing 740 cooperate to define part of convective cooling passageway 782, while cooling shroud 783 and the circumferentially adjacent portion of pressure housing 714 cooperate to form annular plenum 784 to channel a portion of the compressed air to premixer 760. The balance of the compressed air flow is used for additional convective cooling and finally dilution, using a configuration and construction similar to that shown in FIG. 5A.

However, the engine system configuration shown in FIG. 7 is intended for producing power at essentially constant high pressure spool shaft speed. Like the FIG. 1A embodiment, the total compressed air flow rate will not automatically adjust to a changed fuel flow in the manner of gas generator module 512 in the FIG. 5A embodiment. As a result, combustor system 710 specifically includes compressed air valve 790 integrated with premixer 760 and under the control of controller 794, which also controls fuel valve 792, to achieve a preselected lean fuel/air ratio. It is understood that, although not shown, the FIG. 7 embodiment could include features described in relation to the other embodiments, including a liner-mounted ignitor, auxiliary fuel spray system, staged dilution ports, etc.

FIG. 8 depicts yet another combustor system for a gas turbine gas engine module, made in accordance with the present invention. Similar to the combustor systems shown in FIGS. 1A, 5A, and 7, combustor system 810 includes an annular combustor housing 840 having a single stage combustion zone 854 and a dilution zone 856 adjacent to dilution ports 858b immediately upstream of turbine inlet nozzle 850. System 810 also includes an external premixer 860 in which a predetermined portion of the compressed air from plenum space 884, surrounding housing 840, is mixed with the fuel using venturi 868 and admitted to combustion zone 854 from venturi 868 through inlet port 843. Also, as in the FIGS. 1A, 5A and 7 embodiments, essentially the remainder portion of the compressed air is admitted to the dilution zone via dilution ports (ports 858b in FIG. 8) after being channeled to provide further cooling of the combustor housing.

In the constructions in FIGS. 1A, 5A and 7, the remainder portion flow was divided proximate the dilution ports with one part being channeled to achieve turbine shroud cooling (e.g., through channel 82a in FIG. 1A) with the other part flowing directly to the dilution ports (e.g., along channel 82 in FIG. 1A). In comparison, substantially the entire remainder portion of the compressed air flow in system 810 is channeled for cooling turbine shroud 857 via channel 882a before entering the dilution zone through ports 858b, and the combustion volume of housing 840 is increased accordingly, as compared e.g., to the volume of housing 540 in the FIG. 5 embodiment. In this way, the remainder portion of the compressed air cools both the combustor liner and the radial turbine shroud, thus integrating the shroud cooling function with the functions ordinarily provided by the combustor system. The configuration in FIG. 8 is less complex, and therefore less costly, and can help to provide adequate control of the clearance between turbine shroud 857 and turbine 820.

Figure 9A:
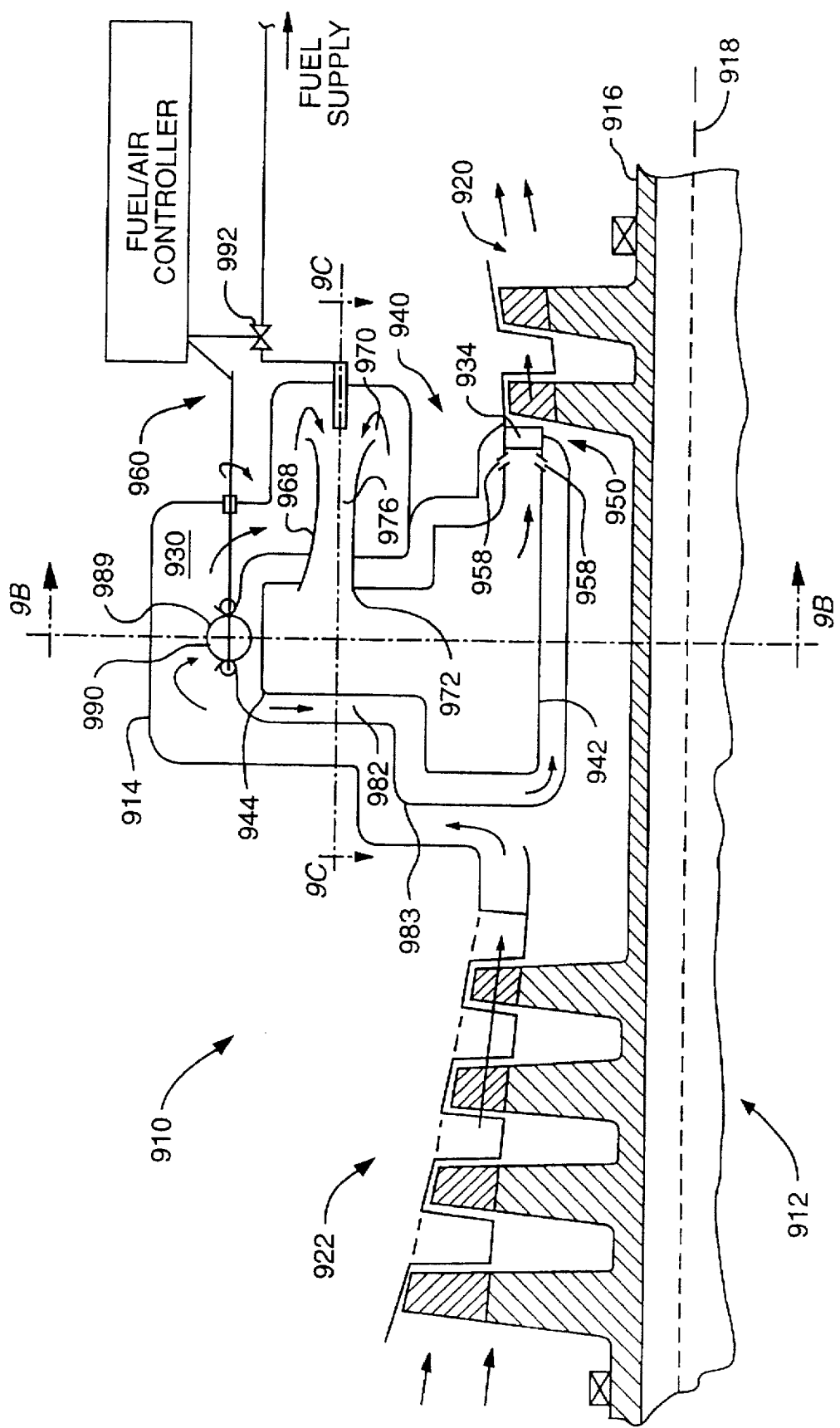
FIG. 9A is a partial schematic cross-sectional view of yet another embodiment of the single stage combustor system of the present invention shown with an axial flow gas turbine.

FIGS. 9A–9E show still other embodiments of the present invention, which further embodiments are particularly useful in large gas turbine engines, both industrial and aircraft types. Specifically, and as best seen in FIG. 9A, combustor system 910 is shown in use with axial flow gas turbine designated generally 912 only a portion of which is shown in the drawings. Gas turbine 912 includes axial flow compressor 922 and axial flow turbine 920 both mounted on shaft 916 which defines axis of rotation 918 of the gas turbine. Although shaft 916 is shown as a solid member in the above embodiment, the shaft can be made hollow to accommodate a separate shaft, such as for a separate low pressure spool (not shown), as one of ordinary skill in the art would understand. Also, the compressor/turbine/shaft assembly is shown supported by bearings outboard of the axial compressor and turbine components, but other known shaft support arrangements could be used.

Figure 9B:
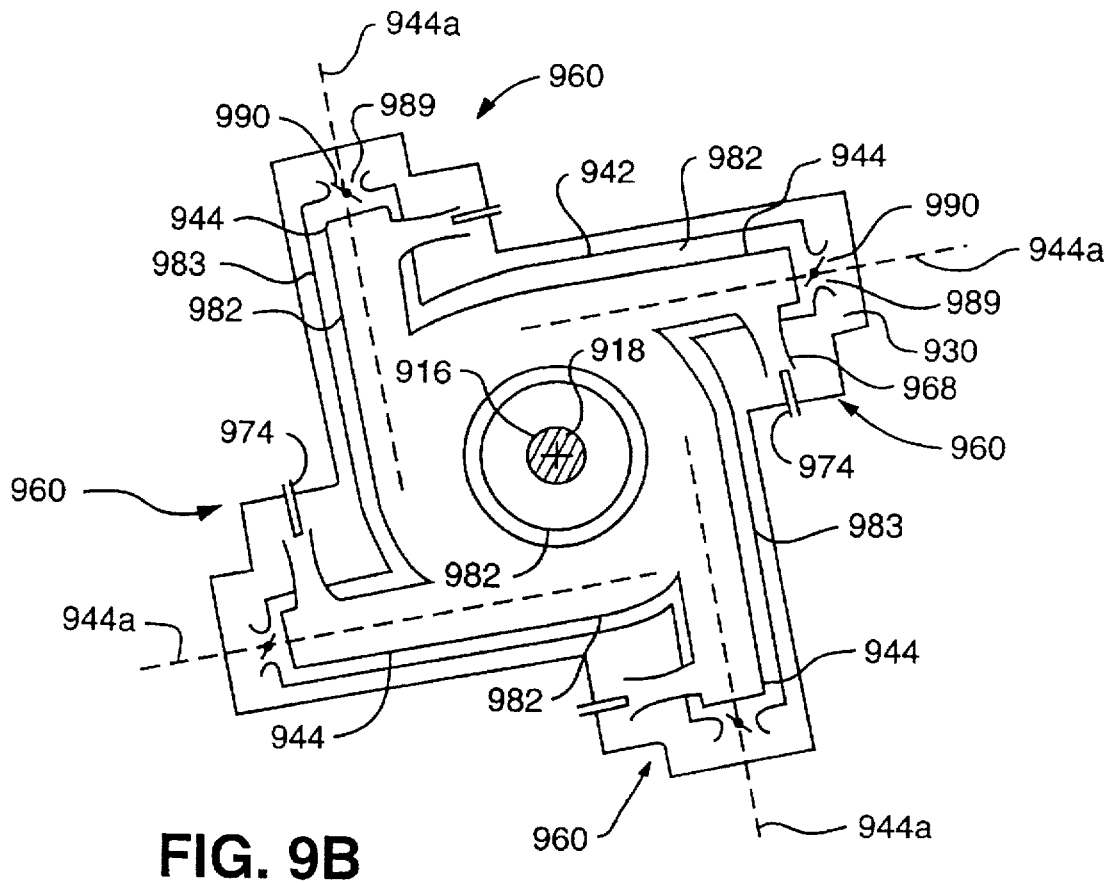
FIG. 9B is a schematic sectional view of the embodiment of FIG. 9A taken along the line 9B—9B in FIG. 9A.

With continued reference to FIG. 9A, combustor system 910 includes combustion chamber 940 having an annular chamber portion 942 surrounding the turbine shaft and nested between compressor 922 and turbine 920. Combustion chamber 940 further includes, in the depicted example, four can-like chamber portions 944 arranged on, and protruding from the outer periphery of, annular chamber portion 942 (only one can chamber portion being shown in FIG. 9A) giving a four-pointed "star" appearance when viewed axially. As best seen in FIG. 9B, the can chamber portions 944 are arranged with their respective axes 944a turbine/shaft tangential with respect to, and angularly spaced about, the axis of annular chamber portion 942 which, in the above embodiment, is coincident with axis 918 of gas turbine 912. Note that for clarity, the positions of premixers 960 in FIG. 9B have been rotated about the can chamber portion axes, relative to the position shown in FIG. 9A. Although can chamber portions 944 are depicted as being purely tangential, their orientation may include an axial component depending upon the space envelope requirements of the particular application.

Figure 9E:
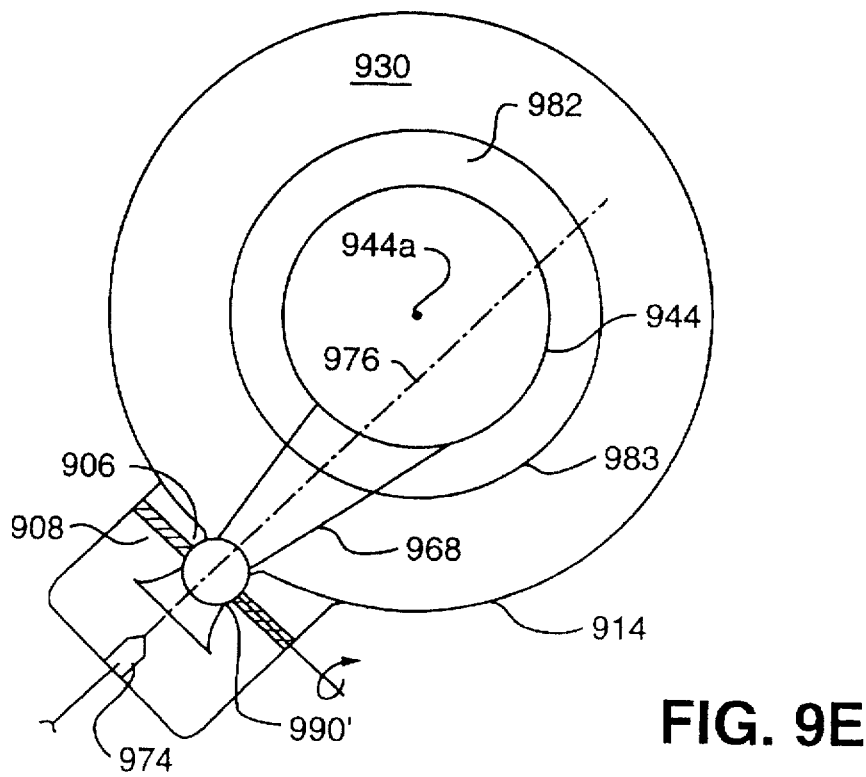
FIG. 9E is a schematic sectional view taken along the line 9E—9E in FIG. 9D.
Figure 9C:
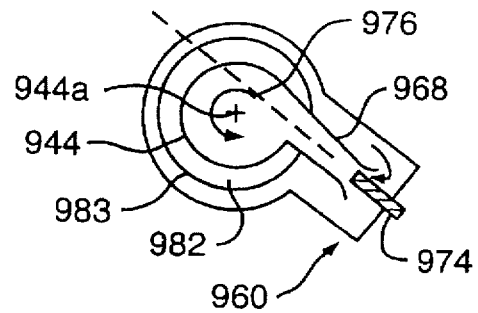
FIG. 9C is a schematic sectional view taken along the line 9C—9C in FIG. 9A.

With continued references to FIGS. 9A and 9B, four separate external fuel/air premixers 960 are operatively connected to respective can chamber portions for delivery of premixed fuel and air to combustion chamber 940. In the depicted embodiment, the individual premixers 960 are oriented tangentially with respect to the axes of the respective can chamber portions each of which is substantially cylindrical in the depicted embodiment, for imparting a swirl in the can chamber portion. See FIG. 9C depicting the orientation of premixer 960 which includes venturi 968 arranged with venturi axis 976 substantially tangential to axis 944a of can chamber portion 944.

As one skilled in the art would realize, the number of can chamber portions 944 and respective premixers 960 will depend upon the size of the engine and other design constraints of the particular application. Importantly, the combustion volumes of can chamber portions 944 and annular chamber portion 942 together are sized such that combustion occurs in both combustion chamber parts. That is, the volume of each can chamber portion 944 is insufficient to provide total combustion of the amount of fuel and air introduced by the respective premixer 960 such that combustion of the fuel/air continues and is completed in annular chamber portion 942. This is in contrast to so-called "precombustion" systems where additional fuel and/or air is added to the process after the partly combusted fuel exists the precombustion region. In the combustor of the present invention, no additional air or fuel is added to the annular chamber portion until dilution air is added at the chamber exit.

This combustion is aided by the swirling flow caused not only by the tangential admission of the lean fuel/air mixture into the can chamber portions 944 but also the subsequent substantially tangential admission of the partially combusted fuel/air mixture from the can chamber portions 944 into the annular chamber portion 942. This utilization of the volumes of the can chamber portions for combustion allows a reduction in size of the annular chamber portion compared to a combustion chamber configuration wherein the entire combustion volume must be nested between the compressor and the turbine. The resultant shortened axial length between the compressor and turbine may provide improved rotor dynamics of the compressor/turbine/shaft assembly, particularly if the shaft is unsupported between the compressor and turbine, as is depicted in the present embodiment. Or, if the combustor system is to be added to an existing engine, this can be done without changing the rotor dynamics of the engine.

Still further, the liner housing members defining chamber portions 944 and annular chamber portion 942 are surrounded by a spaced shroud member 983 to define convective cooling passages 982 collectively surrounding can chamber portions 944 and annular chamber portion 942. Passages 982 are sized and configured to provide forced convection cooling for the adjacent combustion chamber walls based on the expected cooling air flow rates and combustion chamber operating temperatures. Film cooling is purposefully not employed in combustion chamber 940 so that the fuel/air mixture undergoing combustion can be closely controlled at the desired lean ratios. One skilled in the art would be able to design the shroud member 983 to achieve the convection cooling passages 982 needed for a given engine application. Also, a plenum region 930 is formed by an engine housing member 914 surrounding and spaced from shroud member 983 and the premixer venturi inlets 970. Plenum region 930 is operatively connected such as by suitable ducting to receive essentially all of the compressed air from compressor 922. Again, one skilled in the art could construct a suitable housing member 914 given the present disclosure.

For the "indirect" control embodiment depicted in FIGS. 9A–9C, a portion of the air collected in plenum region 930 from compressor 922 enters passages 982 through respective apertures 989 controlled by air valves 990 and flows along the outside of combustor can chamber portions 944 and the annular chamber portion 942 for convection cooling. The air used to convectively cool combustion chamber 940 subsequently is added to the combusted fuel/air mixture as dilution air proximate exit 950 of annular chamber portion 942. FIG. 9A schematically depicts dilution ports 958 in the part of annular chamber portion 942 defining exit 950.

In the embodiment shown in FIGS. 9A–9C, the premixers receive compressed air from the compressor via plenum region 930, the same plenum from which air is drawn to provide convection cooling and, eventually, dilution air. Hence, control over the portion of the compressed air flowing to the venturis 968 is effected indirectly by the control of air valves 990 leading to the convective cooling passages 982. Specifically, the relative flow portions going to combustion and going to dilution are controlled by the magnitude of the pressure drop imposed by the air valves 990 which, advantageously, can be mounted in the "cold" end of the combustor system. As shown in FIG. 9A, air valves 990 can be under the control of fuel/air controller 994, which can be a microprocessor, which also monitors and/or controls the fuel flow to fuel nozzle 974 via fuel valve 992 to provide the desired lean fuel/air ratio for the engine. The controller will provide simultaneous metering of fuel and air for all the premixers in the system. A microprocessor-type controller 994 could be programmed to provide a variety of different predetermined control schemes, such as constant (e.g., lean) fuel/air ratio for steady state operation and variable ratio (e.g., richer) for transient conditions. Also, although not shown, controller 994 can receive inputs relating to power demand, compressed air mass flow rate, ambient temperature and pressure, and calorific content of the fuel to adjust the fuel and fuel/air ratio accordingly. One skilled in the art would be able to implement a desired control scheme including controller 994 given the present description.

Control over the fuel/air ratio in the combustion chamber is further assured by sealing off the combustion volume defined by the can chamber portions 944 and the annular chamber portion 942 from the cooling air for those regions where combustion is occurring and restricting the admission of the dilution air to a location closely adjacent the exit 950 of annular chamber portion 942. For reasons also discussed previously, this control over the fuel/air ratio and subsequent mixing provides a homogeneous combustible gas mixture and thus a uniform combustion temperature of the lean premixed charge with a significant lowering of $NO_x$, CO, and unburnt hydrocarbon emissions.

Figure 9D:
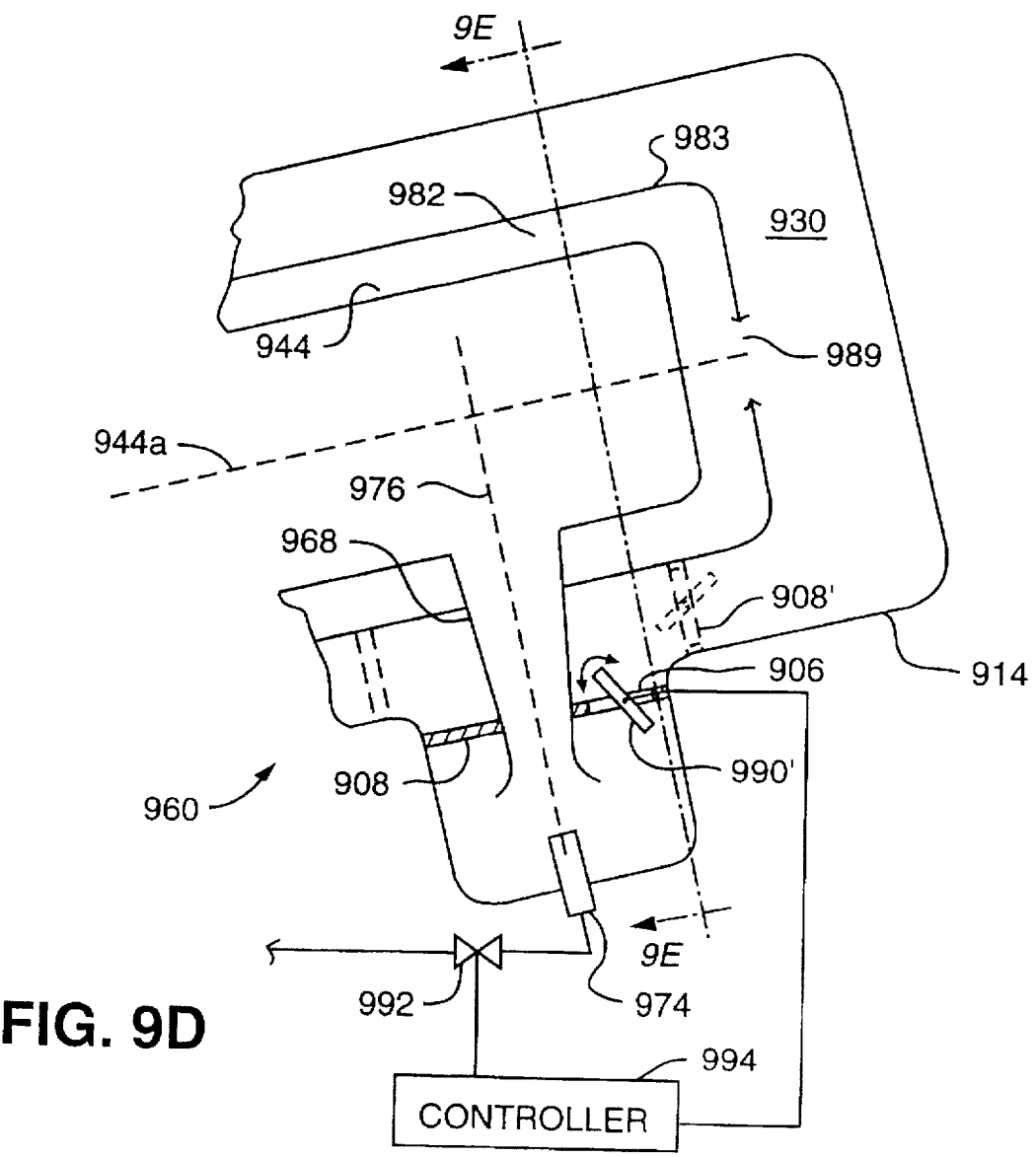
FIG. 9D is a partial schematic cross-section of a "direct control" alternative to the embodiment of FIGS. 9A–9C.

While the construction depicted in FIGS. 9A–9C may be preferred if ease of construction of the combustion chamber is a paramount concern, it may nevertheless be more preferred from an emission control standpoint to utilize a construction wherein the compressed air flow to premixers 960 is controlled directly, versus the indirect control afforded by the embodiment of FIGS. 9A–9C. FIGS. 9D and 9E depict such an alternative, "direct control" embodiment wherein divider plates 908 are used to partition the respective venturi inlets 970 from the plenum region 930 created by the engine housing 914 and combustion chamber shroud member 983, in a manner similar to the construction in FIGS. 3A, 3B and 4. Associated apertures 906 and air valves 990' are provided in the divider plates 908 for positive compressed air flow control. Air valves 990' are shown in FIG. 9E as "butterfly" type but other arrangements and valve shapes could be used, as would be appreciated by one skilled in the art.

In the FIG. 9D and 9E construction, apertures 989 connecting plenum region 930 and the convective cooling passages 982 can preferably be "valveless", as depicted, and the air valves 990' which are associated with apertures 906 in divider plates 908 are operatively connected to controller 994 for control to a desired, typically lean, fuel/air ratio. While FIG. 9D depicts the divider plate 908 positioned essentially perpendicular to venturi axis 976 in a construction similar to that shown in FIGS. 3A, 3B and 4, the divider plate could be positioned parallel to the venturi axis (depicted by dotted lines 908' in FIG. 9D). Such a position would entail the use of a collar-shaped divider plate and may increase the complexity of the apparatus. One skilled in the art would understand that the shape of the particular combustion chamber being designed and desired fabrication technique may make one or the other divider plate position more preferred.

In the embodiments depicted in FIGS. 9A–9E, the plenum region supplying compressed air to the premixers 960 and to the convection coolant passages 982 (and eventually to dilution ports 958) is conveniently formed between engine housing 914 and shroud member 983 and is collected from the outlet of compressor 922 by suitable ducts. Other configurations are possible depending once again upon the particular space constraints imposed by a particular application. Moreover, premixers 960 may be made modular, particularly the embodiment shown in FIGS. 9D and 9E where divider plate 908 can conveniently be configured to hold venturi 968 and a domed cap portion 914a of engine housing 914. Also, guide vanes 934 can be arranged between the outlet of the annular chamber portion and the first rotating set of turbine blades in a manner understood by those skilled in the art to provide control over the angle of incidence of the hot gases exiting the combustion chamber. See FIG. 9A.

The premixers 960 utilized in the embodiments depicted in FIGS. 9A–9E each include venturi element 968 having inlet 970 and outlet 972, and fuel nozzle 974 aligned to provide a fuel spray into the region surrounding inlet 970, as disclosed generally in respect to the premixer embodiments discussed above. For example, although not shown, premixers 960 can have the region between venturi inlet 970 and the exit of fuel nozzle 974 surrounded by a flow smoothing element that also helps to straighten the fuel spray stream entering the venturi and minimize attachment of the fuel drops to the inner walls of the venturis, for reasons discussed previously. Various venturi wall heating means described previously (also not shown) can be employed to increase the rate of liquid fuel vaporization.

It may be possible to eliminate air valves 990 and 990' from the configurations depicted in FIGS. 9A–9C and 9D and 9E, respectively, for certain applications, such as described above in relation to the embodiment depicted in FIGS. 5A and 5B. In such cases, orifices having fixed, predetermined flow rate/pressure drop characteristics may be substituted. However, because of the relative simplicity of the valve arrangements shown in FIGS. 9A–9E compared to conventional systems, one adopting the present invention may desire to retain the valves for "fine tuning" the air flow splits.

Because of its shape and nesting ability, the "star"-shaped combustor configuration discussed above generally in relation to the embodiment shown in FIGS. 9A–9E is expected to have widespread utility, particularly in retrofit applications. The preexisting space envelope demands of such applications can be accommodated by varying the respective combustion volumes of the can and annular portions of the combustion chamber, as would be understood by one of ordinary skill in the art. For reasons discussed above in relation to the dynamics of the rotor elements, the available space envelope may more easily accommodate increases in the diameter or the axial length of the can chamber portions, or the number of such can chamber portions, to achieve the necessary combustion volume.

It is expected that at least some of such retrofit applications may allow only a minimum volume annular chamber portion, that is, a volume only marginally greater than that required to distribute the hot combustion gases evenly to the circumference of the turbine. In such cases, it may be advantageous to configure the can chamber portions to provide all, or substantially all, of the volume necessary for complete combustion and configure the annular chamber portion to optimize collection and distribution of the combustion gases. FIG. 10 represents schematically such a case, in which the can chamber portion 1044 is shown enlarged volumetrically relative to the annular chamber portion 1042. In the succeeding discussions and in the appended claims, the use of the term "annular chamber portion" is, therefore, not to be construed as requiring some combustion to occur in the element designated 1042.

In FIG. 10, like FIGS. 9A–9E, annular chamber portion 1042 is nested axially between the compressor and the turbine components, schematically depicted at 1022 and 1020 respectively, which are interconnected for dependent rotation by shaft 1016. Compressed air from compressor 1022 is collected in plenum 1030 formed between engine housing 1014 and shroud member 1083, which, as in the previous embodiments, surrounds and is spaced from both can chamber portion 1044 and annular chamber portion 1042. The compressed air intended for combustion flows from the plenum 1030 to premixer 1060 and is mixed with fuel from fuel nozzle 1074 and is admitted to the can chamber portion through inlet 1043 in the can chamber portion circumferential side wall 1044b. Although not shown in FIG. 10, the direction of admission of the fuel/air mixture through the venturi is preferably tangential to axis 1044a of the can chamber portion. Also, the control of the compressed air for combustion is achieved "directly" in the manner described previously in relation to the embodiment depicted in FIGS. 9D and 9E, although the "indirect" control could be used. The compressed air not flowing to the premixers for use as combustion air flows through aperture 1089 and along the inside of the shroud member 1083, to achieve cooling of the can chamber portion walls, and eventually is admitted to the combustion chamber as dilution air.

Contrary to the embodiments shown in FIGS. 9A–9E, the admission of at least some of the dilution air in the FIG. 10 embodiment occurs in the can chamber portion near the junction of the can chamber portion and the annular chamber portion, through dilution air inlet ports 1058a. Moving the dilution ports upstream of annular chamber exit 1050, relative to the location of the dilution ports in the embodiment shown in FIGS. 9A–9E, is possible because of the sizing of the can chamber portion to provide essentially complete combustion within the can chamber portion. Thus, dilution air inlet ports 1058a can be positioned near the connection 1044c between can chamber portion 1044 and annular chamber 1042, such as in the depicted location in the can chamber sidewall, and still maintain the close control over the fuel/air ratio in the combustion process, a central objective of the present invention for reasons described previously. Depending on the particular application, a further portion of the dilution air may be introduced closely adjacent the annular chamber exit through dilution ports 1058b (shown dotted in FIG. 10) or at other locations in annular chamber portion 1042.

It is further contemplated that the annular chamber portion of the combustor shown in FIG. 10 may be used to "reheat" the combustion gases received from the can chamber portion if a portion of the operating regime yields combustion gas temperatures at the annular chamber exit lower than desired. As shown dotted in FIG. 10, an auxiliary premixer including venturi 1068a, air valve 1090a, and associated fuel nozzle 1074a is provided in the axial side wall of the annular chamber portion 1042, although other locations would be possible. The fuel/air mixture admitted directly into the interior of the annular chamber portion undergoes combustion, raising the temperature of the combustion gases prior to exiting at annular chamber exit 1050. Auxiliary fuel nozzle 1074a and air valve 1090a would be controlled by suitable control means such as the microprocessor type controller used for fuel/air controller 1094. Such a controller could utilize temperature signals from a temperature sensor such as sensor 1001 located adjacent annular chamber exit 1050 to provide feedback control of the combustion gas exit temperature. While not required, the depicted venturi-type fuel/air premixer contemplated for the reheat function should act to minimize any increase in $NO_x$ and other emissions due to combustion in the volumetrically reduced annular chamber portion.

For the reasons discussed above, the present "star" combustor configuration can accommodate the space envelope constraints that typically preclude retrofitting existing gas turbines with conventional combustor systems. While not specifically shown in FIG. 10, various modifications in the disclosed apparatus can be made depending upon the particular application including, but not limited to, the type and construction of the premixer and the orientation of the can chamber portion relative to the annular chamber portion. With respect to the latter point, ease of construction may make a radial orientation more preferred, compared to the tangential orientation shown in the FIGS. 9A–9E embodiments, if essentially no combustion in the annular portion is intended. However, if reheat combustion is required, it may be preferable to retain a tangential orientation to facilitate the combustion process.

EXAMPLE

In order to assess the performance of the annular combustor system of the present invention, an annular combustor having the fuel/air premixer as shown in FIGS. 3A–3C was atmospherically tested using an external source of air and a gaseous fuel (natural gas). Table 1 presents values of the important dimensions of the apparatus used in the test.

TABLE 1

| Volume of combustion chamber | $(12.3 \times 10^{-3} \text{ m}^3)$ |
|---|---|
| Outer diameter of combustion zone | (0.346 m) |
| Inner diameter of combustion zone | (0.200 m) |
| Radial distance from the housing axis to the venturi axis | (0.124 m) |
| Diameter of the venturi | |
| Throat | (45 mm) |
| Exit | (75 mm) |
| Perforated element hole diameter and pitch | ($\phi 3.75 \times 5$ mm) |

Tests were done at flow conditions corresponding to idle and full load. Flow rates to achieve a preselected fuel/air ratio were set by manually setting compressed air valve 290 and the fuel valve (not shown) rather than by a controller element although a controller element could have been used. Table 2 presents the fuel and compressed air flow rates and other important parameters as well as the measured $NO_x$ levels and approximate CO emission levels for the tests.

TABLE 2

| LOAD | IDLE | FULL |
|---|---|---|
| BTU rating of natural gas (MJ/kg) | 38.02 | 38.02 |
| Fuel flow rate (g/s) | 2.45 | 3.12 |
| Total air flow rate: (g/s) | 183 | 160 |
| Fuel/Air Ratio | 0.033 | 0.033 |
| Compressed air inlet temperature (°C.) | 376 | 430 |
| Total pressure loss (percent): | 5 | 3 |
| Total air factor: | 2.3 | 2.3 |
| Pattern factor (percent): | 11 | 8 |
| $NO_x$ (ppm) at 15% $O_2$: | 5 | 3 |

The above indicates remarkably low $NO_x$ emission levels which, even if scaled for high pressure operation, still would be well below the values considered representative of state of the art gas turbine engine module combustor systems using premixers. See G. Leonard et al., "Development of Aero Derivative Gas Turbine DLE Combustion System", Diesel and Gas Turbine Worldwide, May 1993, pp. 22 and 24.

With the above detailed description of the annular combustor system and fuel/air premixer apparatus and method of operating same of the present invention, those skilled in the art would appreciate that modifications may be made to the invention without departing from its spirit. Therefore, it is not intended that the scope of the invention be limited to the specific embodiments illustrated and described above. Rather, it is intended that the scope of this invention be determined by the appended claims and their equivalents.

What is claimed is:

1. A combustor for combusting fuel and compressed air to produce combustion gases, for use in a gas turbine having a compressor and a turbine mounted spaced apart on a common shaft, the combustor comprising:

a chamber having an annular chamber portion with an axis, a radially outer surface, and an exit for delivery of combustion gases, and at least one can chamber portion protruding from said radially outer surface and flow connected to said annual chamber portion, and a fuel/air inlet for admitting the fuel and the compressed air for combustion into said can chamber portion, and a fuel/air premixer cooperating with said fuel/air inlet, wherein said premixer delivers the fuel/air mixture along a direction substantially tangential to said can chamber portion axis, wherein said annual chamber portion is configured radially to surround the shaft and axially to nest between the compressor and the turbine.

2. A gas turbine having the combustor configured and mounted as in claim 1.

3. A gas turbine as in claim 2, wherein said compressor is an axial or combined axial-radial compressor and said turbine is an axial turbine.

4. The combustor as in claim 1 including a cooling shroud member surrounding and spaced from said can chamber portion and said annular chamber portion for defining a convective cooling passageway.

5. A combustor for combusting fuel and compressed air to produce combustion gases, for use in a gas turbine having a compressor and a turbine mounted spaced apart on a common shaft, the combustor comprising:

a chamber having an annular chamber portion with an axis, a radially outer surface, and an exit for delivery of combustion gases, and at least one can chamber portion protruding from said radially outer surface and flow connected to said annular chamber portion, said can chamber portion having a fuel/air an inlet for admitting the fuel and the compressed air for combustion into said can chamber portion, wherein said annular chamber portion is configured radially to surround the shaft and axially to nest between the compressor and the turbine, and wherein said can chamber portion has an axis and a circumferential side wall, and said fuel/air inlet includes a fuel/air inlet port positioned in the circumferential side wall of said can chamber portion distant said annular chamber portion.

6. The combustor as in claim 5, wherein said can chamber portion includes in the circumferential side wall a dilution air inlet proximate said annular chamber portion for admitting compressed air for dilution.

7. The combustor as in claim 5, including a cooling shroud member surrounding and spaced from said can chamber portion, wherein the compressed air flows to said dilution air inlet in the space between said cooling shroud and said can chamber portion.

8. A gas turbine having the combustor configured and mounted as in claim 5.

9. The gas turbine as in claim 8 wherein said compressor is an axial or combined axial-radial compressor and said turbine is an axial turbine.

10. A combustor for combusting fuel and compressed air to produce combustion gases, for use in a gas turbine having a compressor and a turbine mounted spaced apart on a common shaft, the combustor comprising:

a chamber having an annular chamber portion with an axis, a radially outer surface, and an exit for delivery of combustion gases, and at least one can chamber portion protruding from said radially outer surface and flow connected to said annular chamber portion, and a fuel/air inlet for admitting the fuel and the compressed air for combustion into said can chamber portion, wherein said annular chamber portion is configured radially to surround the shaft and axially to nest between the compressor and the turbine, wherein said can chamber portion is proportioned such that substantially complete combustion occurs in said can chamber portion, said chamber having dilution air inlet ports proximate the flow connection between said can chamber portion and said annular chamber portion, and wherein the combustor further including means for reheating the combustion gases in said annular chamber portion.

11. The combustor as in claim 10, wherein said reheating means includes means for introducing additional fuel into said annular chamber portion for combustion with a portion of the admitted dilution air.

12. The combustor as in claim 10, wherein said reheating means is responsive to the temperature of the combustion gases proximate said annular chamber exit.

13. The combustor as in claim 11, wherein said can chamber portion has an axis and is oriented tangentially with respect to said annular chamber portion axis.

14. A gas turbine having the combustor configured and mounted as in claim 10.

15. The gas turbine as in claim 14 wherein said compressor is an axial or mixed axial-radial compressor and said turbine is an axial turbine.

* * * * *

UNITED STATES PATENT AND TRADEMARK OFFICE
CERTIFICATE OF CORRECTION

PATENT NO.: 5,628,182

DATED: May 13, 1997

INVENTOR(S): R. Jan Mowill

It is certified that an error appears in the above-identified patent and that said Letters Patent is hereby corrected as shown below:

Claim 7, col. 25, line 23, "claim 5" should read --claim 6--.

Signed and Sealed this

Fifteenth Day of July, 1997

Attest:

BRUCE LEHMAN

Attesting Officer

Commissioner of Patents and Trademarks